(12) United States Patent
Ito et al.

(10) Patent No.: US 12,232,234 B2
(45) Date of Patent: Feb. 18, 2025

(54) ENTERTAINMENT APPARATUS, LIGHT EMISSION CONTROLLING APPARATUS, OPERATION DEVICE, LIGHT EMISSION CONTROLLING METHOD AND PROGRAM

(71) Applicant: Sony Interactive Entertainment Inc., Tokyo (JP)

(72) Inventors: Akinori Ito, Tokyo (JP); Hiroshi Morita, Kanagawa (JP); Tomoe Ochiai, Tokyo (JP); Takeshi Igarashi, Kanagawa (JP); Yuji Takeuchi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/353,951

(22) Filed: Jul. 18, 2023

(65) Prior Publication Data

US 2023/0363067 A1    Nov. 9, 2023

Related U.S. Application Data

(63) Continuation of application No. 17/952,374, filed on Sep. 26, 2022, now Pat. No. 11,711,878, which is a
(Continued)

(51) Int. Cl.
*A63F 13/24* (2014.01)
*G06F 3/01* (2006.01)
(Continued)

(52) U.S. Cl.
CPC ............ *H05B 47/115* (2020.01); *G06F 3/011* (2013.01); *H05B 47/165* (2020.01); *A63F 13/235* (2014.09)

(58) Field of Classification Search
CPC ...... A63F 13/24; A63F 13/213; A63F 13/235; A63F 13/428; A63F 13/843; H05B 47/115; H05B 47/165
See application file for complete search history.

(56) References Cited

U.S. PATENT DOCUMENTS

| 8,350,805 | B2 | 1/2013 | Miyazaki |
| 10,456,672 | B2 | 10/2019 | Champy |
| (Continued) | | | |

FOREIGN PATENT DOCUMENTS

| CN | 101534914 A | 9/2009 |
| CN | 101997972 A | 3/2011 |
| (Continued) | | |

OTHER PUBLICATIONS

The First Office Action for corresponding CN Application No. 201980079172.3, 17 pages, dated Nov. 2, 2023.
(Continued)

*Primary Examiner* — Tung X Le
(74) *Attorney, Agent, or Firm* — Kilpatrick Townsend & Stockton LLP

(57) ABSTRACT

There is provided a controller for receiving input from a user, including: a plurality of input elements, each operating to receive respective operative input from a user, the respective operative input being processed and transmitted to an external apparatus for manipulating an application program during execution; a memory having a plurality of sets of profile data stored therein, each set of profile data includes a respective profile ID in association with respective location information indicative of where a respective one of the input elements is located on the controller; a communication unit operating to receive a user-selected one of the plurality of sets of profile data; and a control unit operating to control
(Continued)

the controller based on the selected profile data set received from the communication unit.

6 Claims, 32 Drawing Sheets

Related U.S. Application Data continuation of application No. 17/297,166, filed as application No. PCT/JP2019/046803 on Nov. 29, 2019, now Pat. No. 11,490,491.

(60) Provisional application No. 62/776,499, filed on Dec. 7, 2018.

(51) Int. Cl.
*H05B 47/115* (2020.01)
*H05B 47/165* (2020.01)
*A63F 13/235* (2014.01)

(56) References Cited

U.S. PATENT DOCUMENTS

| | | |
|---|---|---|
| 2005/0043089 A1 | 2/2005 | Nguyen |
| 2008/0318687 A1 | 12/2008 | Backer |
| 2009/0174657 A1 | 7/2009 | Miyazaki |
| 2009/0215526 A1 | 8/2009 | Matsumoto |
| 2010/0225582 A1* | 9/2010 | Ohta ............... A63F 13/219 345/158 |
| 2011/0045813 A1 | 2/2011 | Choi |
| 2011/0086706 A1 | 4/2011 | Zalewski |
| 2011/0118024 A1 | 5/2011 | Lucas |
| 2011/0211110 A1 | 9/2011 | Doublet |
| 2012/0046767 A1* | 2/2012 | Shimohata ........... A63F 13/65 700/91 |
| 2014/0025747 A1* | 1/2014 | Sarkar ............... H04W 4/21 709/204 |
| 2016/0192458 A1 | 6/2016 | Keith |
| 2016/0279523 A1 | 9/2016 | Altagar |
| 2017/0127114 A1* | 5/2017 | Lee ............... H04N 21/4516 |
| 2018/0192621 A1 | 7/2018 | Valatka |
| 2018/0359246 A1* | 12/2018 | Dannemiller ......... A63F 13/23 |
| 2019/0020493 A1* | 1/2019 | Arling ............... G10L 15/22 |

FOREIGN PATENT DOCUMENTS

| | | |
|---|---|---|
| JP | 2007089897 A | 4/2007 |
| JP | 2007275474 A | 10/2007 |
| JP | 2010123087 A | 6/2010 |
| JP | 2014050061 A | 3/2014 |
| JP | 2018162621 A | 10/2018 |

OTHER PUBLICATIONS

Notice of Reasons for Refusal for corresponding JP Application No. 2022-124885, 8 pages, dated Oct. 6, 2023.
International Search Report for corresponding PCT Application No. PCT/JP2019/046803, 4 pages, dated Feb. 18, 2020.
International Preliminary Report on Patentability and Written Opinion for corresponding PCT Application No. PCT/JP2019/046803, 12 pages, dated Jun. 17, 2021.

* cited by examiner

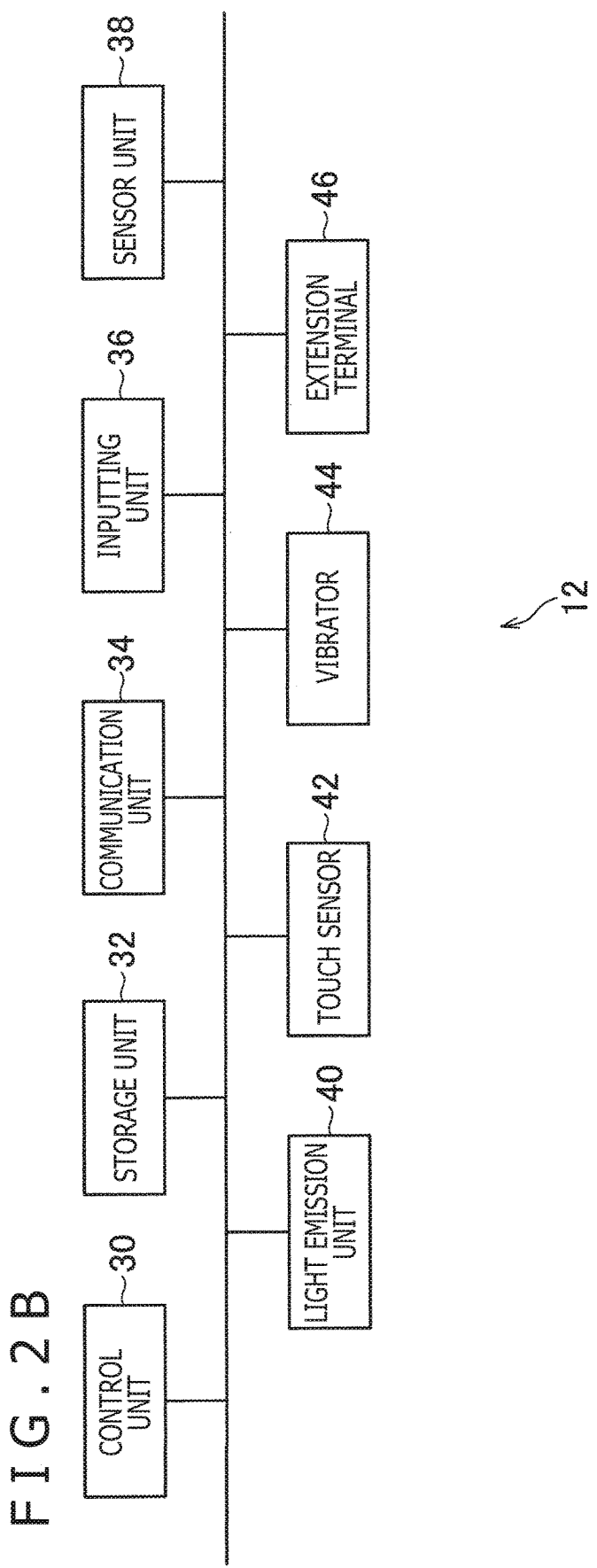

FIG.30

| DEVICE ID | LIGHT EMISSION COLOR DATA | LIGHT EMISSION PATTERN DATA | CONTROLLER ID | USER ID |
|---|---|---|---|---|
| 1 | BLUE | LEFT UPPER | 111_111_111 | Mike |
| 2 | RED | RIGHT UPPER | 222_222_222 | |
| 3 | GREEN | LEFT LOWER | | |
| 4 | MAGENTA | RIGHT LOWER | | |

ENTERTAINMENT APPARATUS, LIGHT EMISSION CONTROLLING APPARATUS, OPERATION DEVICE, LIGHT EMISSION CONTROLLING METHOD AND PROGRAM

CROSS REFERENCE TO RELATED APPLICATIONS

This is a continuation application of U.S. patent application Ser. No. 17/952,374, accorded a filing date of Sep. 26, 2022, (U.S. Pat. No. 11,711,878 assigned and to issue on Jul. 25, 2023); which is a continuation application of U.S. patent application Ser. No. 17/297,166, accorded a filing date of May 26, 2021, U.S. Pat. No. 11,490,491, issued Nov. 1, 2022; which is a national stage application of International Application No. PCT/JP2019/046803, filed Nov. 29, 2019; which claims the benefit of U.S. Provisional Application No. 62/776,499, filed Dec. 7, 2018, the entire disclosures of which are hereby incorporated by reference.

TECHNICAL FIELD

The present invention relates an entertainment apparatus, a light emission controlling apparatus, an operation device, a light emission controlling method and a program.

BACKGROUND ART

An entertainment apparatus such as a game apparatus to which a plurality of operation devices can be connected is available. In this case, each of the plurality of operation devices has allocated thereto identification information associated therewith such as a device identification (ID).

Thus, a user can perform various inputting operations to the entertainment apparatus using its operation device. For example, when a program of a game is executed in the entertainment apparatus, the user can operate the operation device to execute a command in response to the device ID of the operation device such as movement of a character.

In the case where a plurality of operation devices are connected to the entertainment apparatus, it is necessary for each user to understand identification information of an operation device operated by the user itself.

In order to make the understanding possible, among such operation devices as described above, for example, an operation device is available which includes a plurality of light emission units associated with respective pieces of identification information such that one of the light emission units corresponding to the identification information of the operation device emits light.

Further, for example, an operation device is available which includes a plurality of light emission units such that a number of ones of the light emission units that are associated with the identification information of the operation device emit light.

Furthermore, for example, an operation device is available which includes a plurality of light emission units capable of emitting light of individually different colors such as a plurality of light sources for colors different from each other such that the light emission units emit light in a color corresponding to the identification information of the operation device.

SUMMARY

Technical Problem

However, in the conventional technology described above, sometimes a user cannot easily grasp identification information associated with the operation device operated by the user.

The present invention has been made in view of such a situation as described above, and it is one of objects of the present invention to provide an entertainment apparatus, a light emission controlling apparatus, an operation device, a light emission controlling method and a program that facilitate understanding of identification information associated with the operation device.

Solution to Problem

In order to solve the subject described above, according to an aspect of the present invention, there is provided an entertainment apparatus including: a communication unit configured to receive, from an operation device including a light emission unit, identification information of the operation device; and a control unit configured to associate the identification information of the operation device and user identification information, in which the user identification information includes information indicative of at least a light emission color for the light emission unit and a region from which light is to be emitted, and the communication unit transmits the user identification information to the operation device.

According to another aspect of the present invention, there is provided a light emission controlling apparatus including: an identification information specification unit configured to specify identification information associated with an operation device; a specific light emission region specification unit configured to specify a specific light emission region that is part of a light emission region set to the operation device, the specific light emission region according to the identification information; and a light emission controlling unit configured to control such that at least part of the light emission region emits light in such a manner that a color according to the identification information and the specific light emission region are recognizable.

The light emission controlling apparatus may be configured such that the light emission region includes a plurality of partial light emission regions, and the light emission controlling unit controls such that at least one of the partial light emission regions associated with the specific light emission region emits light.

In this case, the partial light emission regions may individually be arranged along a boundary line of the light emission region.

The light emission controlling unit may control such that at least one of the partial light emission regions associated with the specific light emission region emits light in a color according to the identification information.

In this case, the light emission controlling unit may control such that a number of ones of the partial light emission regions according to the identification information emit light in a color according to the identification information.

The light emission controlling apparatus may further include: a color specification unit configured to specify, for each piece of the identification information, a light emission color corresponding to the piece of the identification information.

The light emission controlling apparatus may further include: a light emission representation specification unit configured to specify, for each piece of the identification information, a light emission pattern corresponding to the piece of the identification information.

In this case, the light emission region may include a plurality of partial light emission regions, and the light emission representation specification unit may specify which one of the partial light emission regions is to emit light.

The light emission controlling apparatus may be configured such that the light emission region includes a first light emission region and a second light emission region, the specific light emission region specification unit specifies, from within the first light emission region, the specific light emission region that is part according to the identification information; the light emission controlling unit controls such that at least part of the first light emission region emits light in a common color irrespective of the identification information in such a manner that the specific light emission region is recognizable; and the light emission controlling unit controls such that at least part of the second light emission region emits light in a color according to the identification information.

The specific light emission region specification unit may specify the specific light emission region having a length according to the identification information.

The specific light emission region specification unit may specify the specific light emission region having an area according to the identification information.

The specific light emission region specification unit may specify the specific light emission region having an area according to the number of the operation devices connected to the light emission controlling apparatus.

The light emission controlling apparatus may further include: a setting changing unit configured to instruct the light emission controlling unit to change between whether the entire light emission region is to emit light in one color and whether at least part of the light emission region is to emit light in such a manner that the specific light emission region that is part of the light emission region and a region other than the specific light emission region of the light emission region are recognizable from each other.

The light emission controlling apparatus may further include: a display controlling unit configured to control a display unit to display a screen image in which information regarding a user who operates the operation device and information representing light emission of the operation device are arranged.

The identification information may be information representative of a color or a number.

According to a further aspect of the present invention, there is provided a light emission controlling apparatus including: an identification information specification unit configured to specify identification information associated with an operation device; a specific light emission region specification unit configured to specify a specific light emission region that is part of a light emission region set to the operation device, the specific light emission region having a length according to the identification information; and a light emission controlling unit configured to control such that at least part of the light emission region emits light in such a manner that the specific light emission region is recognizable.

According to a still further aspect of the present invention, there is provided a light emission controlling apparatus including: an identification information specification unit configured to specify identification information associated with an operation device; a specific light emission region specification unit configured to specify a specific light emission region that is part of a light emission region set to the operation device, the specific light emission region having an area according to the identification information; and a light emission controlling unit configured to control such that at least part of the light emission region emits light in such a manner that the specific light emission region is recognizable.

According to a yet further aspect of the present invention, there is provided an operation device including: a control signal acceptance unit configured to accept a control signal from a light emission controlling apparatus, the light emission controlling apparatus including an identification information specification unit configured to specify identification information associated with the operation device, a specific light emission region specification unit configured to specify a specific light emission region that is part of a light emission region set to the operation device, the specific light emission region according to the identification information, and a light emission controlling unit configured to control such that at least part of the light emission region emits light in such a manner that a color according to the identification information and the specific light emission region are recognizable, the control signal being for controlling such that at least part of the light emission region emits light; and a light emission unit configured to emit light in response to an acceptance of the control signal in such a manner that a color according to the identification information associated with the operation device and the specific light emission region that is part of the light emission region according to the identification information are recognizable.

According to a yet further aspect of the present invention, there is provided an operation device including: a control signal acceptance unit configured to accept a control signal from a light emission controlling apparatus, the light emission controlling apparatus including an identification information specification unit configured to specify identification information associated with the operation device, a specific light emission region specification unit configured to specify a specific light emission region that is part of a light emission region set to the operation device and has a length according to the identification information, and a light emission controlling unit configured to control such that at least part of the light emission region emits light in such a manner that the specific light emission region is recognizable, the control signal being for controlling such that at least part of the light emission region emits light; and a light emission unit configured to emit light in response to an acceptance of the control signal in such a manner that the specific light emission region is recognizable.

According to a yet further aspect of the present invention, there is provided an operation device including: a control signal acceptance unit configured to accept a control signal from a light emission controlling apparatus, the light emission controlling apparatus including an identification information specification unit configured to specify identification information associated with the operation device, a specific light emission region specification unit configured to specify a specific light emission region that is part of a light emission region set to the operation device and has an area according to the identification information, and a light emission controlling unit configured to control such that at least part of the light emission region emits light in such a manner that the specific light emission region is recognizable, the control signal being for controlling such that at least part of the light emission region emits light; and a light emission unit configured to emit light in response to the acceptance of the control signal in such a manner that the specific light emission region is recognizable.

According to a yet further aspect of the present invention, there is provided a light emission controlling method including the steps of: specifying identification information associated with an operation device; specifying a specific light emission region that is part of a light emission region set to the operation device, the specific light emission region according to the identification information; and causing at least part of the light emission region to emit light in such a manner that a color according to the identification information and the specific light emission region are recognizable.

According to a yet further aspect of the present invention, there is provided a light emission controlling method including the steps of: specifying identification information associated with an operation device; specifying a specific light emission region that is part of a light emission region set to the operation device and has a length according to the identification information; and causing at least part of the light emission region to emit light in such a manner that the specific light emission region is recognizable.

According to a yet further aspect of the present invention, there is provided a light emission controlling method including the steps of: specifying identification information associated with an operation device; specifying a specific light emission region that is part of a light emission region set to the operation device and has an area according to the identification information; and causing at least part of the light emission region to emit light in such a manner that the specific light emission region is recognizable.

According to a yet further aspect of the present invention, there is provided a program for causing a computer to execute the procedures for: specifying identification information associated with an operation device; specifying a specific light emission region that is part of a light emission region set to the operation device, the specific light emission region according to the identification information; and causing at least part of the light emission region to emit light in such a manner that a color according to the identification information and the specific light emission region are recognizable.

According to a yet further aspect of the present invention, there is provided a program for causing a computer to execute the procedures for: specifying identification information associated with an operation device; specifying a specific light emission region that is part of a light emission region set to the operation device and has a length according to the identification information; and causing at least part of the light emission region to emit light in such a manner that the specific light emission region is recognizable.

According to a yet further aspect of the present invention, there is provided a program for causing a computer to execute the procedures for: specifying identification information associated with an operation device; specifying a specific light emission region that is part of a light emission region set to the operation device and has an area according to the identification information; and causing at least part of the light emission region to emit light in such a manner that the specific light emission region is recognizable.

BRIEF DESCRIPTION OF THE DRAWINGS

FIG. 2B is a view depicting an example of a configuration of a controller according to the embodiment of the present invention.

FIG. 30 is a view depicting an example of user management data.

DESCRIPTION OF EMBODIMENT

In the following, an embodiment of the present invention is described in detail with reference to the drawings.

Figure 1:
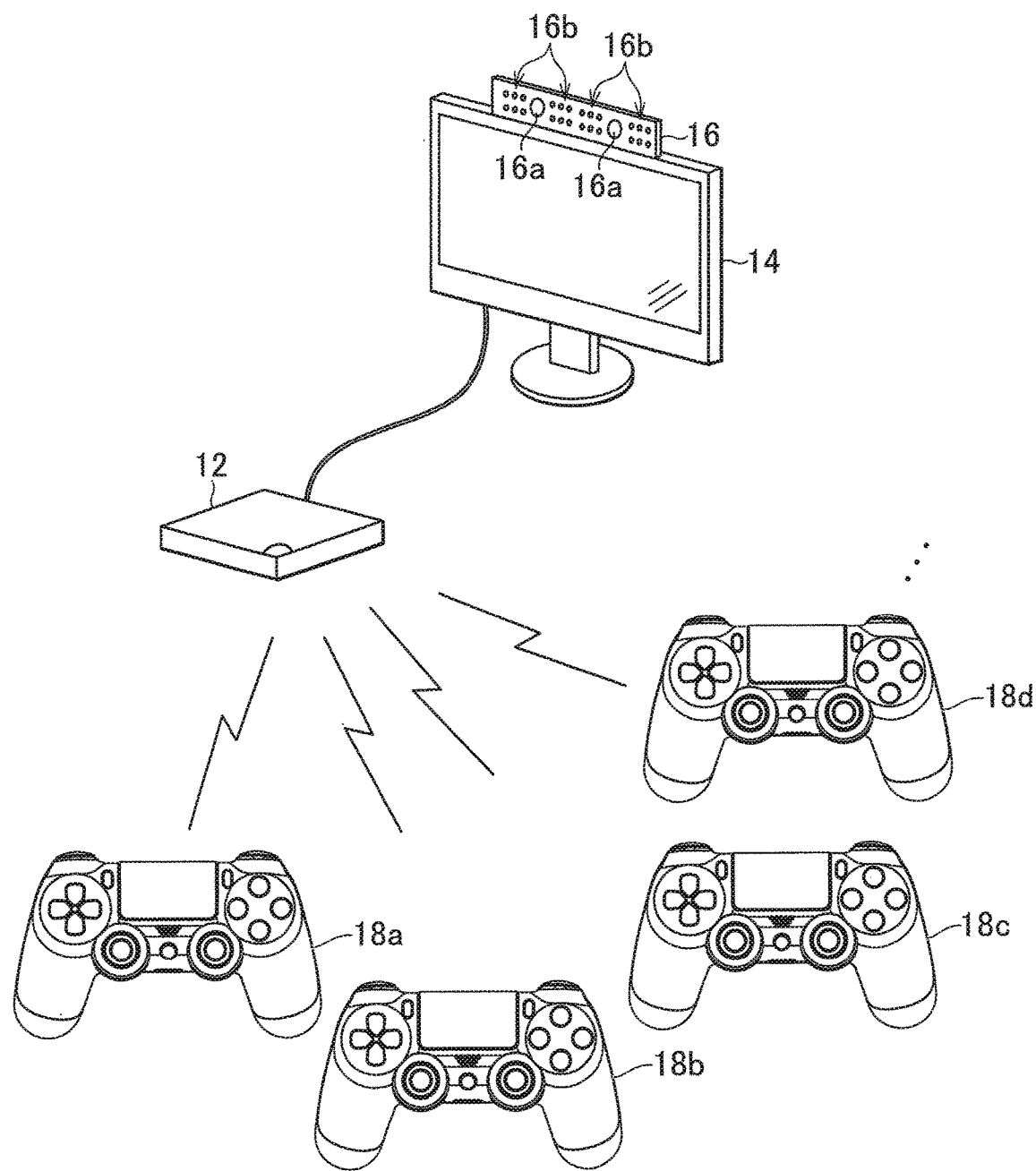
FIG. 1 is a view depicting an example of a general configuration of an entertainment system according to an embodiment of the present invention.

FIG. 1 is a view depicting an example of a general configuration of an entertainment system 10 according to the embodiment of the present invention. As depicted in FIG. 1, the entertainment system 10 according to the embodiment includes an entertainment apparatus 12, a display 14, a camera and microphone unit 16, and controllers 18, namely, controllers 18a, 18b, 18c, 18d, . . . .

The entertainment apparatus 12 according to the present embodiment is a computer such as a game console, a digital versatile disc (DVD) player, or a Blu-ray (registered trademark) player. The entertainment apparatus 12 according to the present embodiment performs execution of a game program or reproduction of a content, for example, stored or recorded on an optical disk to generate video and audio. Then, the entertainment apparatus 12 according to the present embodiment outputs a video signal representing generated video and an audio signal representing generated audio.

Figure 2A:
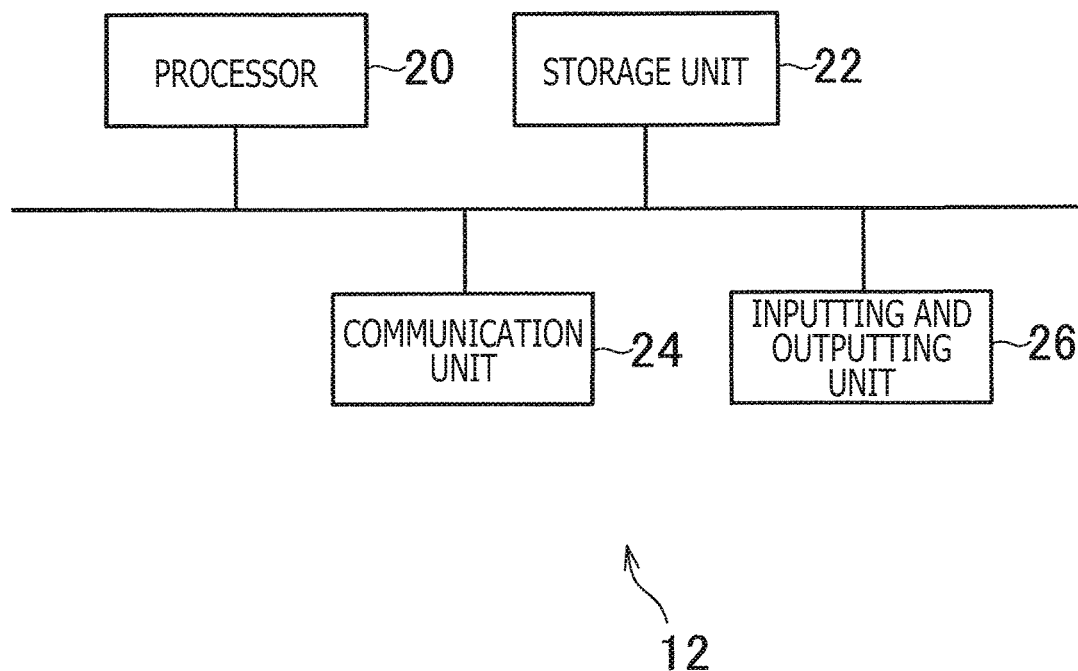
FIG. 2A is a view depicting an example of a configuration of an entertainment apparatus according to the embodiment of the present invention.

For example, as depicted in FIG. 2, the entertainment apparatus 12 according to the present embodiment includes a processor 20, a storage unit 22, a communication unit 24, and an inputting and outputting unit 26.

The processor 20 is a program controlled device (control unit) such as a central processing unit (CPU) that operates in accordance with a program installed in the entertainment apparatus 12. The processor 20 according to the present embodiment also includes a graphics processing unit (GPU) that draws an image in a frame buffer on the basis of a graphics command or data supplied from the CPU.

The storage unit 22 is, for example, a storage element such as a read-only memory (ROM) or a random-access memory (RAM), a hard disk drive or the like. A program to be executed by the processor 20 and so forth are stored in the storage unit 22. Further, a region of a frame buffer in which an image is drawn by the GPU is secured in the storage unit 22 according to the present embodiment.

The communication unit 24 is a communication interface such as a network board, a wireless local area network (LAN) module, or a Bluetooth (registered trademark) module.

The inputting and outputting unit 26 is an input/output port such as a high-definition multimedia interface (HDMI) (registered trademark) port or a universal serial bus (USB) port.

The display 14 according to the present embodiment is, for example, a liquid crystal display and displays video represented by a video signal outputted from the entertainment apparatus 12 or the like.

The camera and microphone unit 16 according to the present embodiment includes, for example, a camera 16a that outputs an image obtained by imaging an imaging object to the entertainment apparatus 12 and a microphone 16b that acquires ambient sounds, converts the ambient sounds into audio data, and outputs the audio data to the entertainment apparatus 12. Further, the camera 16a according to the present embodiment is a stereo camera.

The entertainment apparatus 12 and the display 14 are connected to each other, for example, through an audiovisual (AV) cable, an HDMI cable or the like. The entertainment apparatus 12 and the camera and microphone unit 16 are connected to each other, for example, through a USB cable, an AV cable, an HDMI (registered trademark) cable or the like.

The controllers 18 (controllers 18a, 18b, 18c, 18d, . . . ) according to the present embodiment are operation devices for performing operation inputting to the entertainment apparatus 12.

For example, as depicted in FIG. 2B, each controller 18 according to the present embodiment includes a control unit 30, a storage unit 32, a communication unit 34, an inputting unit 36, a sensor unit 38, a light emission unit 40, a touch sensor 42, a vibrator 44, and an extension terminal 46.

The control unit 30 is a control device such as a digital signal processor (DSP). The storage unit 32 is a storage element such as a memory. The communication unit 34 is a communication interface such as a wireless LAN module or a Bluetooth module. The inputting unit 36 is an inputting operation member including a directional key, a button, an operation stick, a touch pad, and a keypad. The sensor unit 38 is a device such as an acceleration sensor, a motion sensor, a gyro sensor, a global positioning system (GPS) module or the like. The light emission unit 40 is a device including a light source such as a light emitting diode (LED). The light emission unit 40 may include a plurality of light sources for colors different from each other, for example, light sources for red, green, and blue. It is to be noted that a light guide plate (light dispersion member) including acrylic, polycarbonate or the like as a material thereof may be included in the light emission unit 40. Further, the light emission unit 40 may be a display device such as a liquid crystal display (LCD). The touch sensor 42 is a device capable of detecting a position of an object such as a finger of a user. The vibrator 44 is a vibration device such as an actuator. The extension terminal 46 is a terminal such as a USB port.

Figure 3:
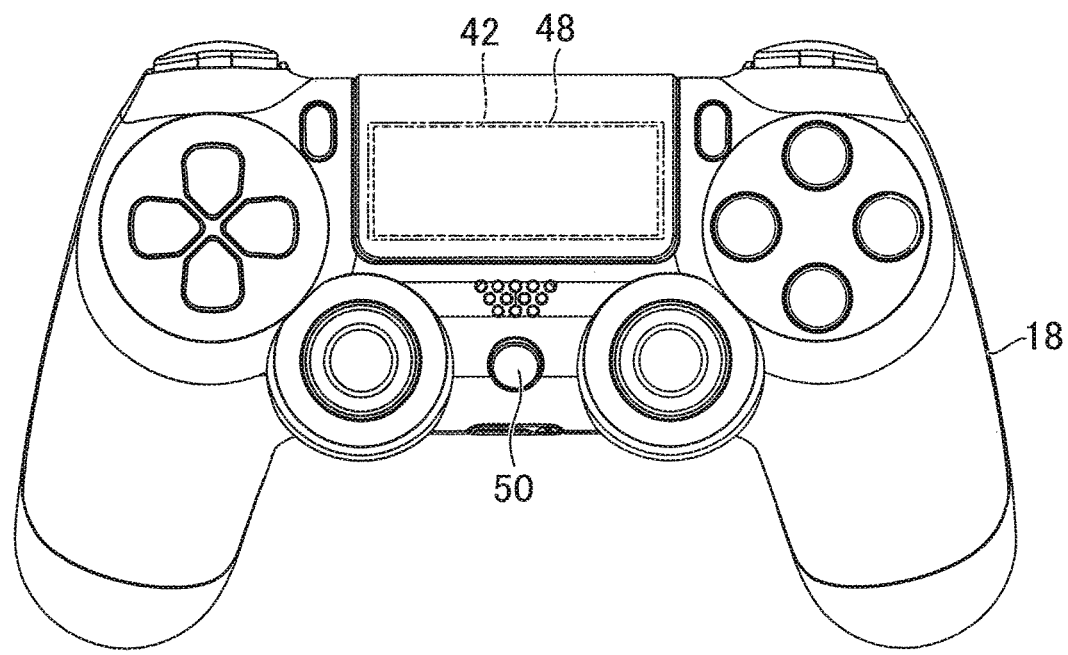
FIG. 3 is a view depicting an example of an upper face of the controller according to the embodiment of the present invention.

An example of an upper face of the controller 18 is depicted in FIG. 3. In the following description, it is assumed that an upward direction in FIG. 3 is a forward direction of the controller 18 and a downward direction in FIG. 3 is a rearward direction of the controller 18.

As depicted in FIG. 3, the controller 18 according to the present embodiment includes a direction key, a button, and an operation stick. The user can depress the direction key or the button provided on the controller 18 and tilt the operation stick to perform various kinds of operation inputting using the controller 18. Further, various kinds of operation inputting can be performed using an output of the sensor unit 38 according to a movement of the controller 18. Then, in the present embodiment, the controller 18 outputs input data associated with the operation inputting to the entertainment apparatus 12.

Further, as depicted in FIG. 3, the touch sensor 42 capable of detecting the position of an object such as a finger of the user is provided at the center on the front side of the upper face of the controller 18 according to the present embodiment.

Further, in the present embodiment, the light emission region 48 is set such that at least part thereof overlaps with the touch sensor 42 as viewed from above. Here, a region that includes and is greater than a region occupied by the touch sensor 42 as viewed from above is set as the light emission region 48. It is to be noted that the region overlapping with the touch sensor 42 as viewed from above may otherwise be set as the light emission region 48. For example, on the controller 18 according to the present embodiment, the light emission unit 40 including a light source such as an LED is provided on a lower face (reverse face of the touch sensor 42). A plurality of light sources for colors different from each other, for example, light sources for red, green, and blue, are included in the light emission unit 40. It is to be noted that a light guide plate (light dispersion member) including acrylic, polycarbonate or the like as a material thereof may be included in the light emission unit 40.

Further, a switch for detecting that the touch sensor 42 is depressed is disposed below the touch sensor 42 and the light emission unit 40. Therefore, the touch sensor 42 also functions as a button whose on/off operation can be performed.

When the user performs a touch operation with the touch sensor 42 using a finger or the like, the controller 18 outputs input data indicative of a position at which the touch operation is performed to the entertainment apparatus 12. Further, when the user performs an on/off operation for the switch described above, the controller 18 outputs input data indicating that the on/off operation is performed to the entertainment apparatus 12. It is to be noted that, in this case, the position detected by the touch sensor 42 when the on/off operation is performed and the input data indicating that the on/off operation is performed may be outputted to the entertainment apparatus 12.

Further, by connecting the controller 18 according to the present embodiment to the entertainment apparatus 12 through a USB cable, the controller 18 can output the input data to the entertainment apparatus 12 by wire communication. Further, the controller 18 according to the present embodiment can output the input data to the entertainment apparatus 12 also by wireless communication.

The controller 18 according to the present embodiment receives a light emission controlling signal transmitted from the entertainment apparatus 12. The light emission controlling signal includes information indicative of a color of light to be emitted, a region to be emit light and so forth. Then, the controller 18 controls the light emission region 48 such that at least part of the light emission region 48 emits light in accordance with the information indicated by the light emission controlling signal.

Further, in the present embodiment, by performing a predetermined connection operation such as an operation of depressing a connection button 50 in FIG. 3 for the controller 18, the controller 18 and the entertainment apparatus 12 are connected to each other to enable operation inputting using the controller 18. Further, the entertainment apparatus 12 according to the present embodiment can be connected to a plurality of controllers 18. Then, in the present embodiment, to each of the controllers 18 connected to the entertainment apparatus 12, identification information associated with the controller 18 is allocated. In the following description, the identification information associated with a controller 18 is referred to as device ID of the controller 18. Here, for example, to a controller 18 connected to the entertainment apparatus 12, a device ID associated with an order in which controllers 18 are connected to the entertainment apparatus 12 may be set.

It is assumed that, in the following description, four controllers 18 are connected to the entertainment apparatus 12 in the order of the controller 18a, controller 18b, controller 18c, and controller 18d. Further, it is assumed that 1, 2, 3 and 4 are set as the device ID to the controller 18a, the controller 18b, the controller 18c, and the controller 18d, respectively. It is to be noted that the device ID may be information indicating not a number but, for example, a color.

Figure 4:
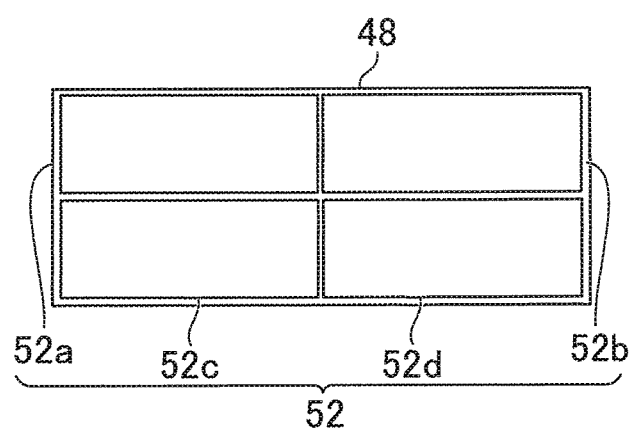
FIG. 4 is a view depicting an example of partial light emission regions.

FIG. 4 is a view schematically depicting an example of partial light emission regions 52 according to the present embodiment. In the example of FIG. 4, four partial light emission regions 52a, 52b, 52c, and 52d are included in the light emission region 48. The partial light emission regions 52a, 52b, 52c, and 52d correspond to a left upper region, a right upper region, a left lower region, and a right lower region when the light emission region 48 is divided into four regions in a matrix of 2×2, respectively.

Then, in the present embodiment, for example, in the controller 18a whose device ID is 1, the partial light emission region 52a is controlled so as to emit light with blue. Meanwhile, in the controller 18b whose device ID is 2, the partial light emission region 52b is controlled so as to emit light with red. Further, in the controller 18c whose device ID is 3, the partial light emission region 52c is controlled so as to emit light with green. Further, in the controller 18d whose device ID is 4, the partial light emission region 52d is controlled so as to emit light with magenta.

Some conventional controllers 18 include a plurality of light emission units individually associated with device IDs such that a light emission unit corresponding to the device ID of the controller 18 emits light. Other conventional controllers 18 include a plurality of light emission units such that a number of light emission units associated with the device ID of the controller 18 emits light. Other conventional controllers 18 include a light emission unit capable of emitting light of a plurality of colors such as a plurality of light sources for colors different from each other such that the light emission unit emits light in a color corresponding to the device ID of the controller 18.

In the present embodiment, by viewing both the light emission region and the emission light color, the user can understand the device ID of the controller 18. Therefore, with the entertainment system 10 according to the present embodiment, the user can easily understand the identification information associated with the controller 18 in comparison with such conventional controllers 18 as described above.

In the following description, the functions of the entertainment apparatus 12 according to the present embodiment are further described focusing on the light emission control of the light emission region 48.

Figure 5A:
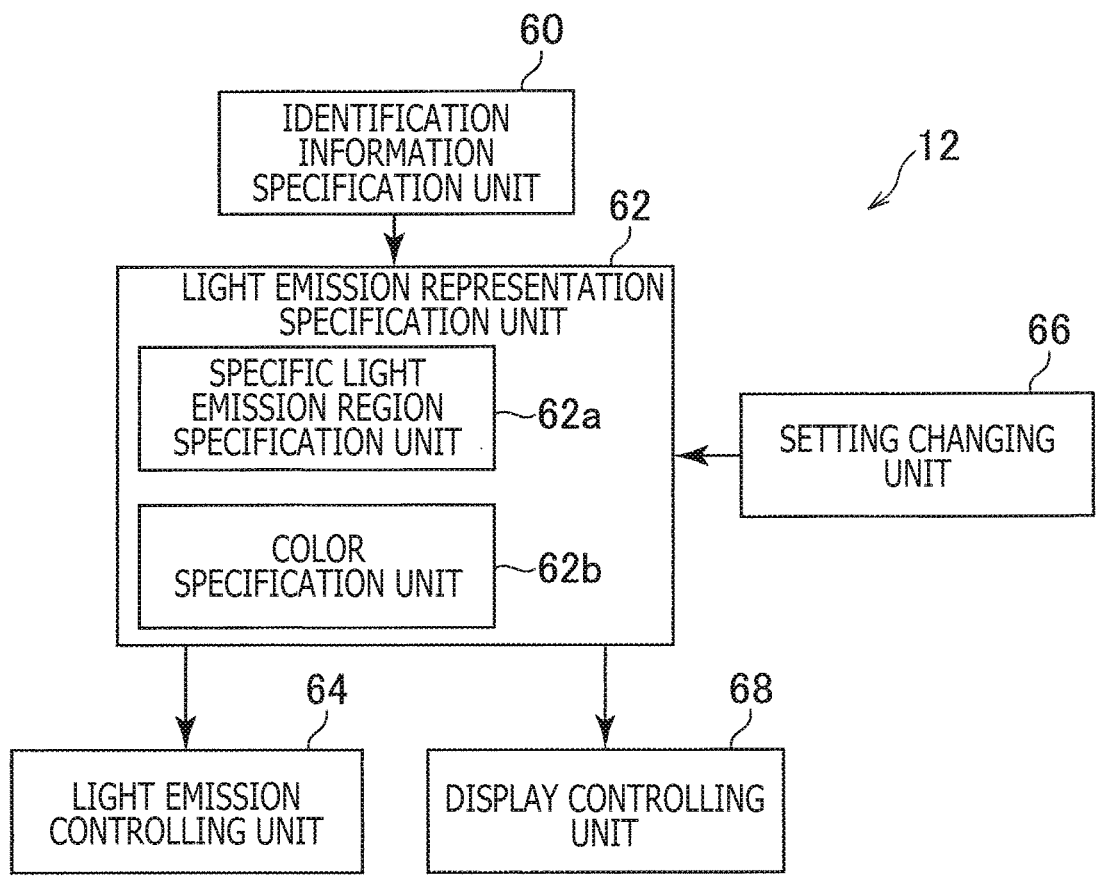
FIG. 5A is a functional block diagram depicting an example of functions incorporated in the entertainment apparatus according to the embodiment of the present invention.

FIG. 5 is a functional block diagram depicting an example of functions incorporated in the entertainment apparatus 12 according to the present embodiment. It is to be noted that all of the functions depicted in FIG. 5 may not be incorporated in the entertainment apparatus 12 according to the present embodiment, and any function other than the functions depicted in FIG. 5 may be incorporated.

As depicted in FIG. 5, the entertainment apparatus 12 according to the present embodiment functionally includes, for example, an identification information specification unit 60, a light emission representation specification unit 62, a light emission controlling unit 64, a setting changing unit 66, and a display controlling unit 68. Further, the light emission representation specification unit 62 includes a specific light emission region specification unit 62a and a color specification unit 62b.

The identification information specification unit 60 and the light emission representation specification unit 62 are implemented mainly by the processor 20. The light emission controlling unit 64 and the setting changing unit 66 are implemented mainly by the processor 20 and the communication unit 24. The display controlling unit 68 is incorporated mainly by the processor 20 and the inputting and outputting unit 26.

The functions described above are incorporated by the processor 20 executing a program installed in the entertainment apparatus 12, which is a computer, and including commands corresponding to the functions. The program is supplied through a computer-readable information recording medium such as an optical disk, a magnetic disk, a magnetic tape, a magneto-optical disk, or a flash memory, or through the Internet or the like to the entertainment apparatus 12.

Figure 5B:
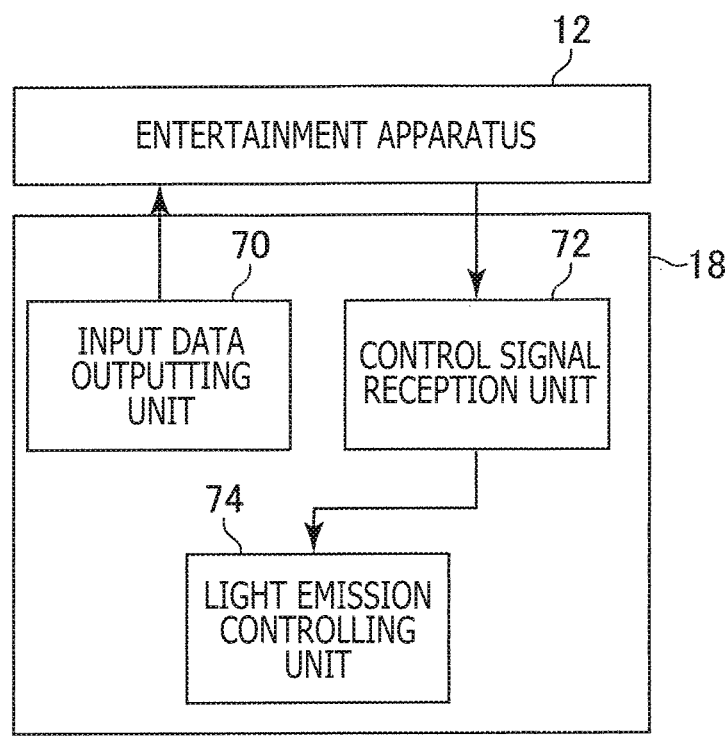
FIG. 5B is a functional block diagram depicting an example of functions incorporated in the entertainment apparatus according to the embodiment of the present invention.

FIG. 5B is a functional block diagram depicting another example of functions incorporated in the controller 18 according to the present embodiment. It is to be noted that all of the functions depicted in FIG. 5B may not be incorporated in the entertainment apparatus 12 according to the present embodiment, and any function other than the functions depicted in FIG. 5B may be incorporated additionally.

As depicted in FIG. 5B, the controller 18 according to the present embodiment functionally includes, for example, an input data outputting unit 70, a control signal reception unit 72, and a light emission controlling unit 74.

The input data outputting unit 70 and the control signal reception unit 72 are implemented mainly by the communication unit 34. The light emission controlling unit 74 is implemented mainly by the control unit 30 and the light emission unit 40.

The identification information specification unit 60 specifies, in the present embodiment, for example, identification information associated with a controller 18, (for example, a device ID). For example, if a connection operation to the controller 18 is executed, then the controller 18 transmits a connection request to the entertainment apparatus 12. Thereafter, processing for connecting the controller 18 and the entertainment apparatus 12 to each other is executed. Thereupon, the identification information specification unit 60 specifies a device ID, which is different from the device ID of a controller 18 connected already to the entertainment apparatus 12, as the device ID of the controller 18.

The light emission representation specification unit 62 specifies, in the present embodiment, for example, a light emission pattern of the light emission region 48 such as a region, a length, and an area to emit light, a light emission color and so forth. Further, the light emission representation specification unit 62 may specify, for each of the device IDs of controllers 18, a light emission pattern corresponding to the device ID. Further, the light emission representation specification unit 62 may specify which partial light emission region 52 is to emit light.

Figure 6:
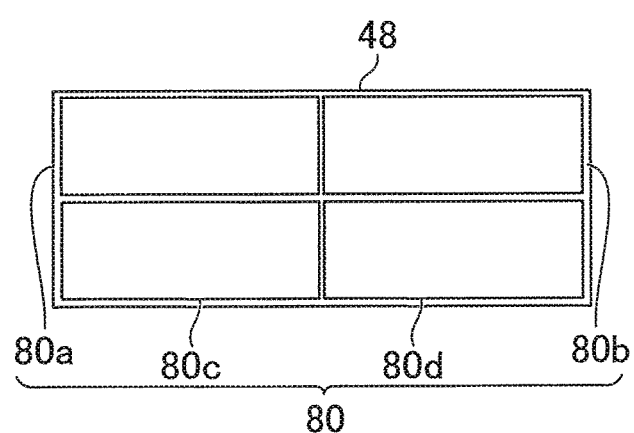
FIG. 6 is a view depicting an example of specific light emission regions.

FIG. 6 is a view schematically depicting an example of specific light emission regions 80. As hereinafter described, a specific light emission region 80 according to the present embodiment is a region that is controlled so as to be recognized by the user. In the example of FIG. 6, left upper, right upper, left lower, and right lower regions are indicated as specific light emission regions 80a, 80b, 80c, and 80d, when the light emission region 48 is divided into four regions in a matrix of 2×2, respectively.

In the example of FIG. 6, the specific light emission regions 80 and the partial light emission regions 52 are associated in a one-to-one correspondence. For example, the specific light emission regions 80a, 80b, 80c, and 80d depicted in FIG. 6 are associated with the partial light emission regions 52a, 52b, 52c, and 52d depicted in FIG. 4, respectively. It is to be noted that the specific light emission regions 80a, 80b, 80c, and 80d depicted in FIG. 6 are same in position, shape, and size with the partial light emission regions 52a, 52b, 52c, and 52d depicted in FIG. 4, respectively.

The specific light emission region specification unit 62a included in the light emission representation specification unit 62 specifies, in the present embodiment, for example, a specific light emission region 80 that is according to a device ID of the controller 18 from within the light emission region 48 set to the controller 18. For example, as a specific light emission region 80 associated with the controller 18a whose device ID is 1, the specific light emission region 80a is specified. Meanwhile, as a specific light emission region 80 associated with the controller 18b whose device ID is 2, the specific light emission region 80b is specified. Further, for example, as a specific light emission region 80 associated with the controller 18c whose device ID is 3, the specific light emission region 80c is specified. Further, for example, as a specific light emission region 80 associated with the controller 18d whose device ID is 4, the specific light emission region 80d is specified.

The color specification unit 62b included in the light emission representation specification unit 62 specifies, in the present embodiment, a color according to, for example, a device ID of the controller 18. The color specification unit 62b may specify a light emission color corresponding to the device ID of the controller 18.

In the present embodiment, it is assumed that the association between device IDs and colors is determined in advance. It is assumed that, for example, blue, red, green, and magenta are associated with the values 1, 2, 3, and 4 of the device ID, respectively. Therefore, in regard to the controller 18a whose device ID is 1, blue is specified as the color according to its device ID. Meanwhile, in regard to the controller 18b whose device ID is 2, red is specified as the color according to its device ID. Further, in regard to the controller 18c whose device ID is 3, green is specified as the color according to its device ID. Further, in regard to the controller 18d whose device ID is 4, magenta is specified as the color according to its device ID.

Further, in the present embodiment, the light emission representation specification unit 62 may operate in accordance with any of a first setting and a second setting determined in advance. In this case, in the first setting, the specific light emission region specification unit 62a may specify the entire light emission region 48 as a specific light emission region 80. Then, in the second setting, the specific light emission region specification unit 62a may specify a specific light emission region 80, which is part of the light emission region 48 set to the controller 18, according to the device ID of the controller 18 as described hereinabove.

The light emission controlling unit 64 controls such that at least part of the light emission region 48 emits light in such a manner that, in the present embodiment, for example, a color according to the device ID and the specific light emission region 80 can be recognized. Here, the light emission controlling unit 64 may control such that at least one of the partial light emission regions 52 associated with a specific light emission region 80 emits light. As an alternative, the light emission controlling unit 64 may control such that at least one of the partial light emission regions 52 associated with a specific light emission region 80 emits light in a color according to the device ID of the controller 18. Further, in this case, the partial light emission regions 52 other than the at least one partial light emission region 52 associated with the specific light emission region 80 may be controlled in such a manner that they do not emit light.

The light emission controlling unit 64 may specify, on the basis of a specific light emission region 80 specified by the specific light emission region specification unit 62a, at least one of the partial light emission regions 52 associated with the specific light emission region 80. Then, the light emission controlling unit 64 may transmit a light emission controlling signal indicative of a color to be specified by the color specification unit 62b and the partial light emission region 52 to be specified to the controller 18. Then, the controller 18 may accept the light emission controlling signal. Then, the light emission unit 40 of the controller 18 may emit light in response to the acceptance of the light emission controlling signal in such a manner that the color according to the device ID of the controller 18 and the specific light emission region 80 can be recognized. For example, the light emission unit 40 of the controller 18 may be controlled such that the partial light emission region 52 indicated by the light emission controlling signal emits light in the color indicated by the light controlling signal.

For example, the light emission controlling unit 64 may transmit, in the first setting, a light emission controlling signal indicative of blue and the entire light emission region 48 to the controller 18a. Then, the controller 18a may control such that the entire light emission region 48 emits light in blue in response to reception of the light emission controlling signal. Further, for example, in the second setting, the light emission controlling unit 64 may specify the partial light emission region 52a as the partial light emission region 52 associated with the specific light emission region 80a. Then, the light emission controlling unit 64 may transmit a light emission controlling signal indicative of blue and the partial light emission region 52a to the controller 18a. Then, the controller 18a may control such that the partial light emission region 52a emits light in blue in response to reception of the light emission controlling signal.

Further, the light emission controlling unit 64 may transmit, in the first setting, a light emission controlling signal indicative of red and the entire light emission region 48 to the controller 18b. Then, the controller 18b may control such that the entire light emission region 48 emits light in red in response to reception of the light emission controlling signal. Further, for example, in the second setting, the light emission controlling unit 64 may specify the partial light emission region 52b as the partial light emission region 52 associated with the specific light emission region 80b. Then, the light emission controlling unit 64 may transmit a light emission controlling signal indicative of red and the partial light emission region 52b to the controller 18b. Then, the controller 18b may control such that the partial light emission region 52b emits light in red in response to reception of the light emission controlling signal.

Similarly, the light emission controlling unit 64 may transmit, in the first setting, a light emission controlling signal indicative of green and the entire light emission region 48 to the controller 18c. Then, the controller 18c may control such that the entire light emission region 48 emits light in green. Further, in the second setting, the light emission controlling unit 64 may transmit a light emission controlling signal indicative of green and the partial light emission region 52c to the controller 18c. Then, the controller 18c may control such that the partial light emission region 52c emits light in green.

Further, the light emission controlling unit 64 may transmit, in the first setting, a light emission controlling signal indicative of magenta and the entire light emission region 48 to the controller 18d. Then, the controller 18d may control such that the entire light emission region 48 emits light in magenta. Further, in the second setting, the light emission controlling unit 64 may transmit a light emission controlling signal indicative of magenta and the partial light emission region 52d to the controller 18d. Then, the controller 18d may control such that the partial light emission region 52d emits light in magenta.

Meanwhile, in the present embodiment, the setting changing unit 66 may instruct, for example, the light emission controlling unit 64 to change between whether the entire light emission region 48 is to emit light in one color and whether at least part of the light emission region 48 is to emit light in such a manner that a specific light emission region 80 and regions other than the specific light emission region 80 of the light emission region 48 can be recognized from each other. Here, the setting changing unit 66 may change whether the light emission representation specification unit 62 is to operate in the first setting or the second setting described above. Further, such change may be performed in response to a predetermined setting changing operation to one of the controllers 18.

In the first setting described above, although the regions that emit light are same among the controllers 18, the light emission colors differ among the controllers 18. In the second setting described above, both the region that emits light and the light emission color differ among the different controllers 18. Then, whether the light emission representation according to the first setting or the light emission representation according to the second setting is better in order to allow the device ID of a controller 18 to be easily understood may possibly differ depending upon the user. According to the function of the setting changing unit 66 described above, any user can select a light emission representation according to its taste.

Figure 7:
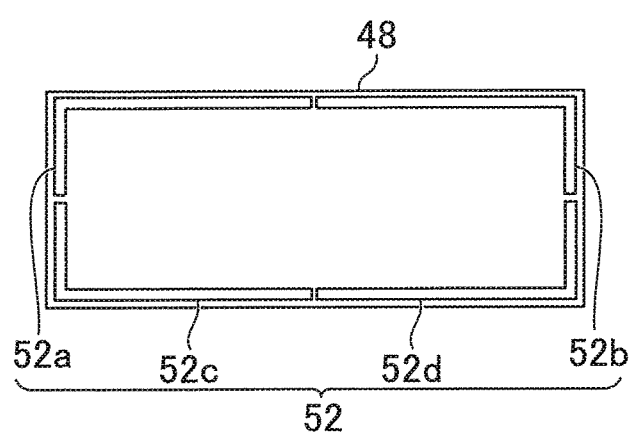
FIG. 7 is a view depicting an example of partial light emission regions.

It is to be noted that the arrangement of the partial light emission regions 52 is not limited to that depicted in FIG. 4. FIG. 7 is a view depicting another example of the partial light emission regions 52 according to the present embodiment. As depicted in FIG. 7, partial light emission regions 52a, 52b, 52c, and 52d may be provided along a boundary line of the light emission region 48. Further, as depicted in FIG. 7, the partial light emission regions 52 may be L-shaped regions along the sides of the light emission region 48. The partial light emission regions 52a, 52b, 52c, and 52d depicted in FIG. 7 are arranged in left upper, right upper, left lower, and right lower regions where the light emission region 48 is divided into four regions in a 2×2 matrix, respectively. Therefore, the partial light emission regions 52a, 52b, 52c, and 52d depicted in FIG. 7 are partial light emission regions 52 associated with the specific light emission regions 80a, 80b, 80c, and 80d depicted in FIG. 6, respectively. Also in the example of FIG. 7, the partial light emission regions 52 emit light such that the specific light emission regions 80 associated with the partial light emission regions 52 can be recognized similarly as in the example of FIG. 4.

Figure 8:
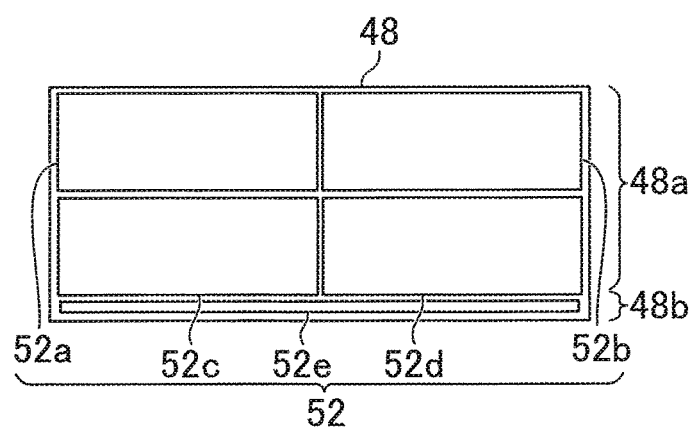
FIG. 8 is a view depicting an example of partial light emission regions.
Figure 9:
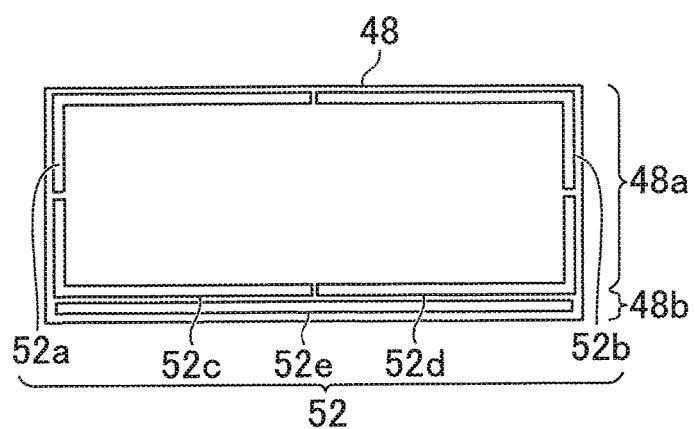
FIG. 9 is a view depicting an example of partial light emission regions.

Alternatively, the light emission region 48 may include a first light emission region 48a and a second light emission region 48b as depicted in FIGS. 8 and 9. The first light emission region 48a depicted in FIGS. 8 and 9 is same in position, shape, and size with the light emission region 48 depicted in FIG. 4. Further, in the examples of FIGS. 8 and 9, the second light emission region 48b is provided under the first light emission region 48a in FIGS. 8 and 9, namely, behind the first light emission region 48a in the controller 18.

The partial light emission regions 52a, 52b, 52c, and 52d depicted in FIG. 8 are same in position, shape, and size with the partial light emission regions 52a, 52b, 52c, and 52d depicted in FIG. 4, respectively. The partial light emission regions 52a, 52b, 52c, and 52d depicted in FIG. 9 are same in position, shape, and size with the partial light emission regions 52a, 52b, 52c, and 52d depicted in FIG. 7, respectively. The second light emission region 48b depicted in FIGS. 8 and 9 includes a partial light emission region 52e.

In the examples of FIGS. 8 and 9, the specific light emission region specification unit 62a may specify a specific light emission region 80 that is part according to the device ID of a controller 18 in the first light emission region 48*a*.

The light emission controlling unit 64 may control such that at least part of the first light emission region 48*a* emits light in a common color such as white irrespective of the device ID of the controller 18 in such a manner that the specified specific light emission region 80 can be recognized. For example, in regard to the controller 18*a*, the partial light emission region 52*a* may be controlled so as to emit light in white. Meanwhile, in regard to the controller 18*b*, the partial light emission region 52*b* may be controlled so as to emit light in white. Further, in regard to the controller 18*c*, the partial light emission region 52*c* may be controlled so as to emit light in white. Further, in regard to the controller 18*d*, the partial light emission region 52*d* may be controlled so as to emit light in white.

Further, the light emission controlling unit 64 may control such that at least part of the second light emission region 48*b* emit light in a color according to the device ID of the controller 18. For example, in regard to the controller 18*a*, the partial light emission region 52*e* may be controlled so as to emit light in blue. Meanwhile, in regard to the controller 18*b*, the partial light emission region 52*e* may be controlled so as to emit light in red. Further, in regard to the controller 18*c*, the partial light emission region 52*e* may be controlled so as to emit light in green. Further, in regard to the controller 18*d*, the partial light emission region 52*e* may be controlled so as to emit light in magenta.

It is to be noted that, in the examples of FIGS. 8 and 9, the first light emission region 48*a* may be controlled such that, in the second setting, it is controlled in such a manner as described above, but in the first setting, it does not emit light.

Figure 10:
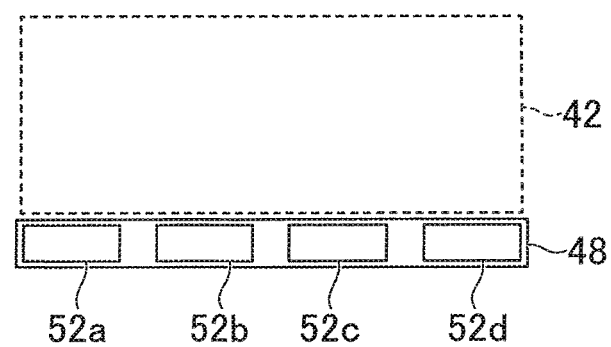
FIG. 10 is a view depicting an example of partial light emission regions.

It is to be noted that the region occupied by the touch sensor 42 when viewed from above or a region including and wider than the region need not to be set as the light emission region 48. FIG. 10 is a view schematically depicting another example of the partial light emission region 52 according to the present embodiment. In the example of FIG. 10, the light emission region 48 is set behind the touch sensor 42, namely, below the touch sensor 42 in FIG. 10. Further, in the light emission region 48, four partial light emission regions 52, namely, the partial light emission regions 36*a*, 52*b*, 52*c*, and 52*d*, are arranged in a row from left to right.

Figure 11:
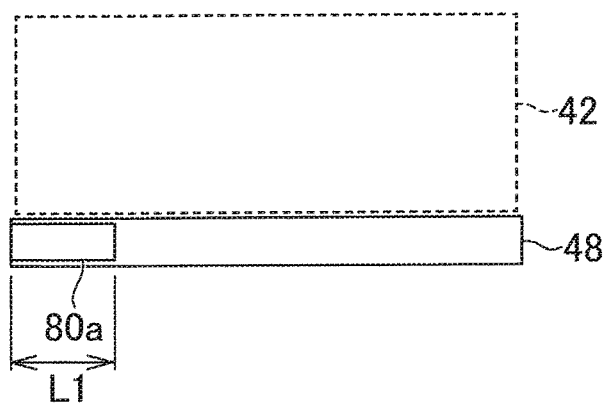
FIG. 11 is a view depicting an example of specific light emission regions.

In this case, the specific light emission region 80*a* may be a region including the left side of the light emission region 48 and having a horizontal length L1 as depicted in FIG. 11. Further, in this case, in regard to the controller 18*a*, the partial light emission region 52*a* that is a partial light emission region 52 associated with the specific light emission region 80*a* may be controlled so as to emit light.

Figure 12:
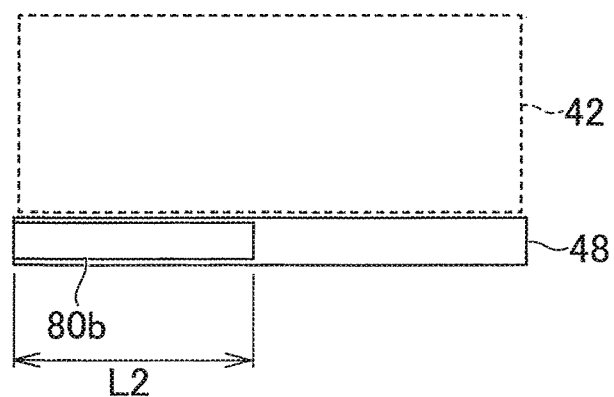
FIG. 12 is a view depicting an example of a specific light emission region.

Further, the specific light emission region 80*b* may be a region including the left side of the light emission region 48 and having a horizontal length L2 as depicted in FIG. 12. Here, the length L2 is longer than the length L1. It is to be noted that the length L2 may be equal to twice the length L1. Further, in this case, in regard to the controller 18*b*, the partial light emission region 52*a* and the partial light emission region 52*b* that are partial light emission regions 52 associated with the specific light emission region 80*b* may be controlled so as to emit light.

Figure 13:
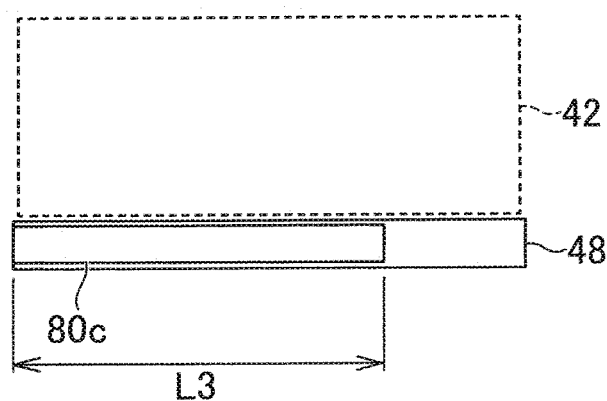
FIG. 13 is a view depicting an example of a specific light emission region.

Further, the specific light emission region 80*c* may be a region including the left side of the light emission region 48 and having a horizontal length L3 as depicted in FIG. 13. Here, the length L3 is longer than the length L2. It is to be noted that the length L3 may be equal to three times the length L1. Further, in this case, in regard to the controller 18*c*, the partial light emission region 52*a*, the partial light emission region 52*b*, and the specific light emission region 80*c* that are partial light emission regions 52 associated with the specific light emission region 80*c* may be controlled so as to emit light.

Further, the specific light emission region 80*d* may be a region occupying the entire light emission region 48. Here, the horizontal length of the light emission region 48 is greater than the length L3. It is to be noted that the horizontal length of the light emission region 48 may be equal to four times the length L1. Further, in this case, in regard to the controller 18*d*, the partial light emission region 52*a*, the partial light emission region 52*b*, the specific light emission region 80*c*, and the specific light emission region 80*d* that are partial light emission regions 52 associated with the specific light emission region 80*d* may be controlled so as to emit light.

In this manner, the partial light emission regions 52 may be controlled such that a number of ones of them according to the device ID of the controller 18 emit light.

It is to be noted that, in the example of FIG. 10, the partial light emission regions 52 may be controlled such that at least one of the partial light emission regions 52 associated with a specific light emission region 80 specified in regard to a controller 18 emits light in a color according to the device ID of the controller 18. Further, the partial light emission regions 52 may be controlled such that at least one of the partial light emission regions 52 associated with a specific light emission region 80 specified in regard to a controller 18 emits light in a common color such as white irrespective of the device ID of the controller 18.

Figure 14:
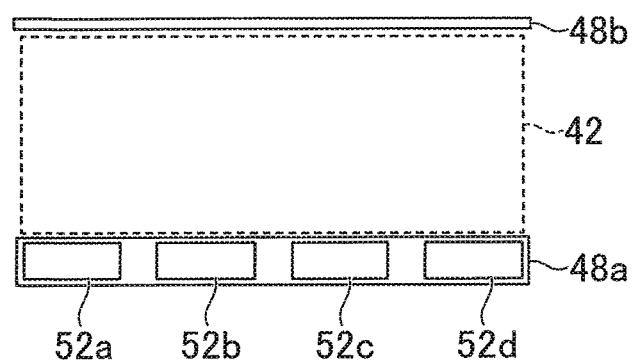
FIG. 14 is a view depicting an example of partial light emission regions.

Further, as depicted in FIG. 14, the light emission region 48 may include a first light emission region 48*a* corresponding to the light emission region 48 in FIG. 10 and a second light emission region 48*b* positioned in front of the touch sensor 42, namely, above the touch sensor 42 in FIG. 14. Further, the first light emission region 48*a* may be controlled such that at least part of the first light emission region 48*a* emits light in a common color such as white irrespective of the device ID of the controller 18 in such a manner that the specific light emission region 80 can be recognized. Here, the partial light emission regions 52 may be controlled such that a number of ones of them according to the device ID of the controller 18 emit light similarly as in the example of FIG. 10. Then, the second light emission region 48*b* may be controlled such that at least part thereof emits light in a color according to the device ID of the controller 18.

Further, in the examples of FIGS. 10 and 14, the partial light emission regions 52 may controlled such that one of the partial light emission regions 52 at a position according to the ID of the controller 18 emits light. For example, in regard to the controller 18*a*, the partial light emission region 52*a* may be controlled so as to emit light. Meanwhile, in regard to the controller 18*b*, the partial light emission region 52*b* may be controlled so as to emit light. Further, in regard to the controller 18*c*, the partial light emission region 52*c* may be controlled so as to emit light. Further, in regard to the controller 18*d*, the partial light emission region 52*d* may be controlled so as to emit light. In this case, in the proximity of each partial light emission region 52, a numeral representative of the device ID associated with the partial light emission region 52 may be indicated.

Figure 15:
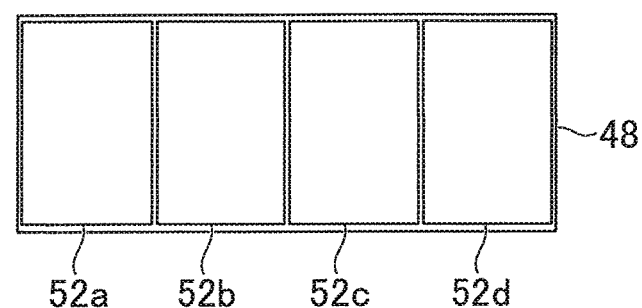
FIG. 15 is a view depicting an example of partial light emission regions.

Further, as depicted in FIG. 15, the four partial light emission regions 52, namely, the partial light emission regions 36*a*, 52*b*, 52*c*, and 52*d*, may be arranged in a row from left to right in a light emission region 48 that is same in position, shape, and size with the light emission region 48 depicted in FIG. 4.

Figure 16:
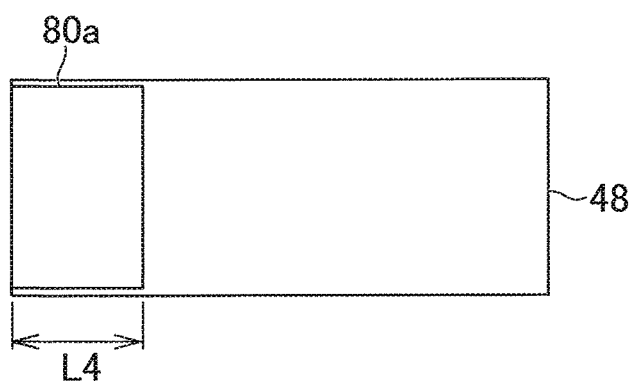
FIG. 16 is a view depicting an example of a specific light emission region.

Further, in this case, as depicted in FIG. 16, the specific light emission region 80a may be a region including the left side of the light emission region 48 and having a horizontal length L4. Further, in this case, in regard to the controller 18a, the partial light emission region 52a that is a partial light emission region 52 associated with the specific light emission region 80a may be controlled so as to emit light.

Figure 17:
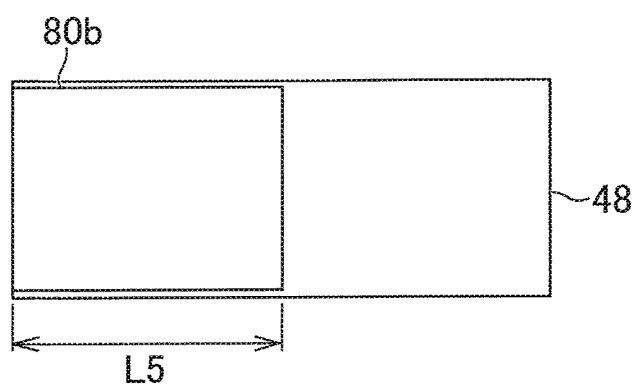
FIG. 17 is a view depicting an example of a specific light emission region.

Further, as depicted in FIG. 17, the specific light emission region 80b may be a region including the left side of the light emission region 48 and having a horizontal length L5. Here, the length L5 is longer than the length L4. It is to be noted that the length L5 may be equal to twice the length L4. Further, in this case, in regard to the controller 18b, the partial light emission region 52a and the partial light emission region 52b that are partial light emission regions 52 associated with the specific light emission region 80b may be controlled so as to emit light.

Figure 18:
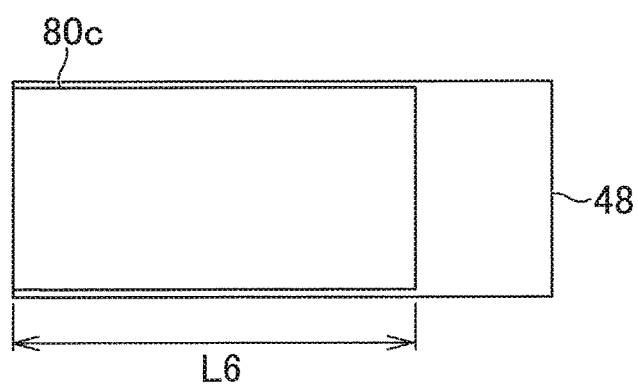
FIG. 18 is a view depicting an example of a specific light emission region.

Further, as depicted in FIG. 18, the specific light emission region 80c may be a region including the left side of the light emission region 48 and having a horizontal length L6. Here, the length L6 is longer than the length L5. It is to be noted that the length L6 may be equal to three times the length L4. Further, in this case, in regard to the controller 18c, the partial light emission region 52a, the partial light emission region 52b, and the specific light emission region 80c that are partial light emission regions 52 associated with the specific light emission region 80c may be controlled so as to emit light.

Further, the specific light emission region 80d may be a region occupying the entire light emission region 48. Here, the horizontal length of the light emission region 48 is greater than the length L6. It is to be noted that the horizontal length of the light emission region 48 may be equal to four times the length L4. Further, in this case, in regard to the controller 18d, the partial light emission region 52a, the partial light emission region 52b, the specific light emission region 80c, and partial light emission region 52d that are partial light emission regions 52 associated with the specific light emission region 80d may be controlled so as to emit light.

Figure 19:
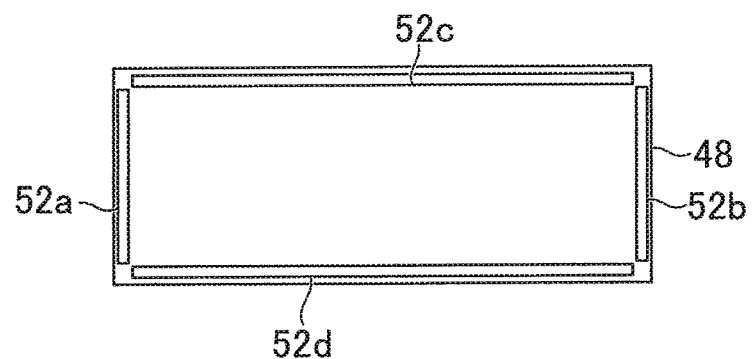
FIG. 19 is a view depicting an example of partial light emission regions.

Further, the partial light emission regions 52a, 52b, 52c, and 52d may be provided at the left end, right end, upper end, and lower end of the light emission region 48, respectively. In particular, for example, the partial light emission regions 52a, 52b, 52c, and 52d may be provided along a boundary line of the light emission region 48 as depicted in FIG. 19. Here, the partial light emission regions 52a, 52b, 52c, and 52d may be provided along the sides of the touch sensor 42 in a region outside the touch sensor 42 when viewed from above. Further, the partial light emission regions 52a, 52b, 52c, and 52d may be provided on the sides of the touch sensor 42 when viewed from above.

Further, in regard to the controller 18a, the partial light emission region 52a may be controlled so as to emit light in blue. Meanwhile, in regard to the controller 18b, the partial light emission region 52a and the partial light emission region 52b may be controlled so as to emit light in red. Further, in regard to the controller 18c, the partial light emission region 52a, the partial light emission region 52b, and the partial light emission region 52c may be controlled so as to emit light in green. Further, in regard to the controller 18d, the partial light emission region 52a, the partial light emission region 52b, the partial light emission region 52c, and the partial light emission region 52d may be controlled so as to emit light in magenta.

Further, for example, the position of a partial light emission region 52 and the light emission color of the partial light emission region 52 may correspond to each other. For example, in regard to the controller 18a, the partial light emission region 52a depicted in FIG. 19 may be controlled so as to emit light in blue. Meanwhile, in regard to the controller 18b, the partial light emission region 52b depicted in FIG. 19 may be controlled so as to emit light in red. Further, in regard to the controller 18c, the partial light emission region 52c depicted in FIG. 19 may be controlled so as to emit light in green. Further, in regard to the controller 18d, the partial light emission region 52d depicted in FIG. 19 may be controlled so as to emit light in magenta.

Figure 20:
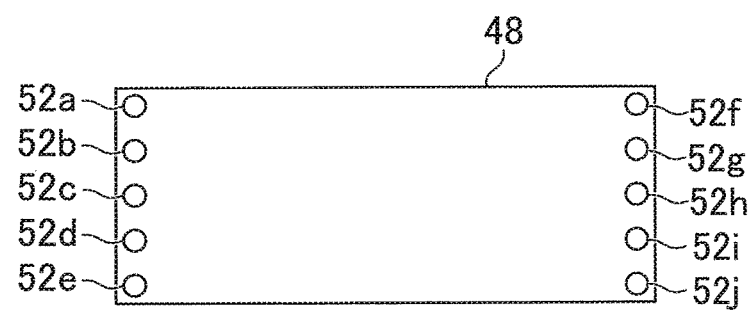
FIG. 20 is a view depicting an example of partial light emission regions.
Figure 21:
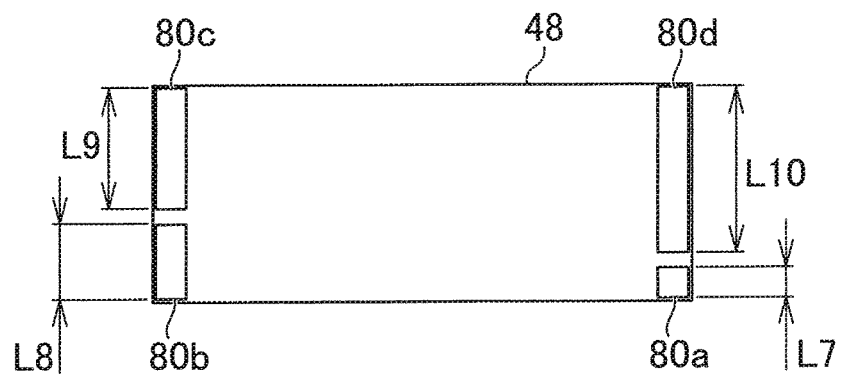
FIG. 21 is a view depicting an example of specific light emission regions.

Further, as depicted in FIG. 20, five partial light emission regions 52 may be arranged side by side in a vertical direction at each of the left and right ends of the light emission region 48. In particular, at the left end of the light emission region 48 depicted in FIG. 20, partial light emission regions 52a, 52b, 52c, 52d, and 36e are arranged from top to bottom. At the right end of the light emission region 48 depicted in FIG. 20, partial light emission regions 52f, 36g, 36h, 36i, and 36j are arranged from top to bottom.

Further, in this instance, the specific light emission region 80a may be a region arranged at a right end lower side of the light emission region 48 and having a vertical length L7. The partial light emission region 52 associated with the specific light emission region 80a is the partial light emission region 52j. In this case, in regard to the controller 18a, the partial light emission region 52j may be controlled so as to emit light in blue.

Further, the specific light emission region 80b may be a region arranged at a left end lower side of the light emission region 48 and having a vertical length L8. Here, the length L8 is greater than the length L7. The partial light emission region 52 associated with the specific light emission region 80b is the partial light emission region 52d and the partial light emission region 52e. In this case, in regard to the controller 18b, the partial light emission region 52d and the partial light emission region 52e may be controlled so as to emit light in red.

Meanwhile, the specific light emission region 80c may be a region arranged at a left end upper side of the light emission region 48 and having a vertical length L9. Here, the length L9 is greater than the length L8. The partial light emission region 52 associated with the specific light emission region 80c is the partial light emission region 52a, the partial light emission region 52b, and the partial light emission region 52c. In this case, in regard to the controller 18c, the partial light emission region 52a, the partial light emission region 52b, and the partial light emission region 52c may be controlled so as to emit light in green.

Further, the specific light emission region 80d may be a region arranged at a right end upper side of the light emission region 48 and having a vertical length L10. Here, the length L10 is greater than the length L9. The partial light emission region 52 associated with the specific light emission region 80d is the partial light emission region 52f, the partial light emission region 52g, the partial light emission region 52h, and the partial light emission region 52i. In this case, in regard to the controller 18d, the partial light emission region 52f, the partial light emission region 52g, the partial light emission region 52h, and the partial light emission region 52i may be controlled so as to emit light in magenta.

As described above with reference to FIGS. 10 to 21, in the present embodiment, the light emission controlling unit 64 may control such that a number of partial light emission regions 52 according to the device ID of the controller 18 emit light. Here, the partial light emission regions 52 may be controlled such that a number of ones of them according to the device ID of the controller 18 emit light in a color according to the device ID.

As described above with reference to FIGS. 10 to 18, 20 and 21, in the present embodiment, the specific light emission region specification unit 62a may specify a specific light emission region 80 having a length according to the device ID of the controller 18.

In the examples of FIGS. 10 to 21, the area of the specific light emission region 80b is greater than that of the specific light emission region 80a. Further, the area of the specific light emission region 80c is greater than that of the specific light emission region 80b. Furthermore, the area of the specific light emission region 80d is greater than that of the specific light emission region 80c. In this manner, the specific light emission region specification unit 62a may specify a specific light emission region 80 having an area according to the device ID of the controller 18.

Further, the specific light emission region specification unit 62a may specify the number of controllers 18 connected to the entertainment apparatus 12. Further, the specific light emission region specification unit 62a may specify specific light emission regions 80 according to the number of controllers 18 connected to the entertainment apparatus 12. For example, the specific light emission region specification unit 62a may specify a specific light emission region 80 having an area according to the number of controllers 18 connected to the entertainment apparatus 12.

Figure 22:
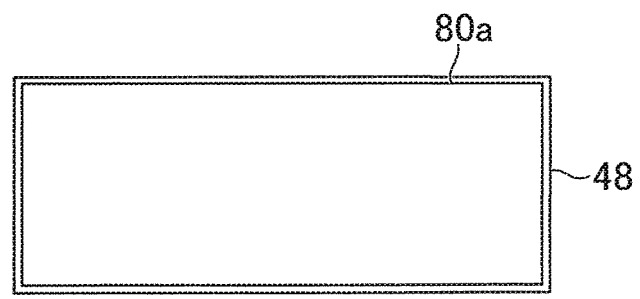
FIG. 22 is a view depicting an example of a specific light emission region.

For example, it is assumed that only the controller 18a is connected to the entertainment apparatus 12 and the number of controllers 18 connected to the entertainment apparatus 12 is one. In this case, the entire light emission region 48 may be specified as the specific light emission region 80a as depicted in FIG. 22. In this case, the controller 18a controls such that the entire light emission region 48 emits light in blue.

Figure 23:
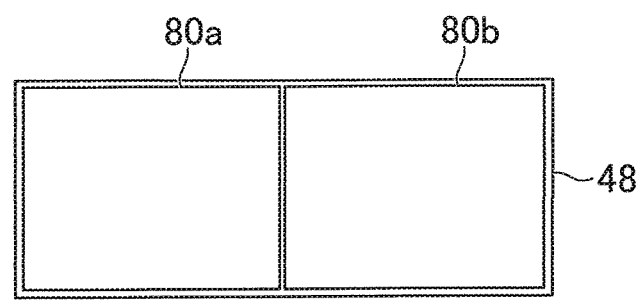
FIG. 23 is a view depicting an example of specific light emission regions.

Then, it is assumed that, for example, the controller 18b is newly connected to the entertainment apparatus 12 and the number of controllers 18 connected to the entertainment apparatus 12 increases to 2. In this case, the left half region of the light emission region 48 may be specified as the specific light emission region 80a and the right half region of the light emission region 48 may be specified as the specific light emission region 80b as depicted in FIG. 23. In this case, the controller 18a changes from a state in which the entire light emission region 48 emits light in blue to another state in which the left half of the light emission region 48 emits light in blue. Here, the partial light emission region 52a and the partial light emission region 52c depicted in FIG. 4 may be controlled so as to emit light. Further, the controller 18b controls such that the right half region of the light emission region 48 emits light in red. Here, for example, the partial light emission region 52b and the partial light emission region 52d depicted in FIG. 4 may be controlled so as to emit light. In this case, the area of the region controlled so as to emit light in the case where the number of connected controllers 18 is two becomes one half the area of the region controlled so as to emit light in the case where the number of connected controllers 18 is one.

Figure 24:
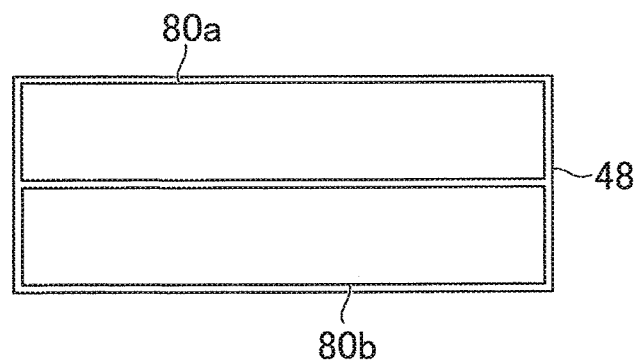
FIG. 24 is a view depicting an example of specific light emission regions.

It is to be noted here that, as depicted in FIG. 24, a region of the upper half of the light emission region 48 may be specified as the specific light emission region 80a and a region of the lower half of the light emission region 48 may be specified as the specific light emission region 80b. In this case, in regard to the controller 18a, the partial light emission region 52a and the partial light emission region 52c depicted in FIG. 4 may be controlled so as to emit light. Further, in regard to the controller 18b, the partial light emission region 52b and the partial light emission region 52d depicted in FIG. 4 may be controlled so as to emit light. Also in this case, the area of the region controlled so as to emit light in the case where the number of connected controllers 18 is two is one half the area of the region that is controlled so as to emit light in the case where the number of connected controllers 18 is one.

Then, it is assumed that, for example, the controller 18c is newly connected to the entertainment apparatus 12 and the number of controllers 18 connected to the entertainment apparatus 12 increases to 3. In this case, similarly as in the example of FIG. 6, a left upper region of the light emission region 48 may be specified as the specific light emission region 80a; a right upper region of the light emission region 48 may be specified as the specific light emission region 80b; and a left lower region of the light emission region 48 may be specified as the specific light emission region 80c. In this case, a light emission representation similar to that in the example described hereinabove with reference to FIG. 6 is provided. Here, also in the case where the controller 18d is further connected to the entertainment apparatus 12, a light emission representation similar to that in the case described hereinabove with reference to FIG. 6 is provided. In this case, the area of the region controlled so as to emit light in the case where the number of connected controllers 18 is three decreases to one half the area of the region that is controlled so as to emit light in the case where the number of connected controllers 18 is two.

It is to be noted that, when the controller 18a and the controller 18b are connected to the entertainment apparatus 12, the left upper region of the light emission region 48 may be specified as the specific light emission region 80a and the right upper region of the light emission region 48 may be specified as the specific light emission region 80b. In this case, in regard to the controller 18a, the partial light emission region 52a depicted in FIG. 4 may be controlled so as to emit light. Meanwhile, in regard to the controller 18b, the partial light emission region 52b depicted in FIG. 4 may be controlled so as to emit light. In this case, the area of the region that is controlled so as to emit light in the case where the number of connected controllers 18 is two decreases to ¼ the area of the region that is controlled so as to emit light in the case where the number of connected controllers 18 is one.

In this manner, the specific light emission region specification unit 62a may specify the specific light emission region 80 whose area decreases as the number of controllers 18 connected to the entertainment apparatus 12 increases. Further, the light emission controlling unit 64 may control such that a number of partial light emission regions 52 according to the number of controllers 18 connected to the entertainment apparatus 12 emit light. Here, the number of specific light emission regions 80 that emit light may be decreased as the number of controllers 18 increases.

According to the foregoing configuration, the user can understand the number of controllers 18 connected to the entertainment apparatus 12 by viewing light emission of the controllers 18, for example, the size of the region that emits light.

In the present embodiment, for example, the display controlling unit 68 controls the display unit such as the display 14 to display a screen image in which, for example, information regarding the user who operates the controller 18 and information representing light emission of the controller 18 are arranged.

Figure 25:
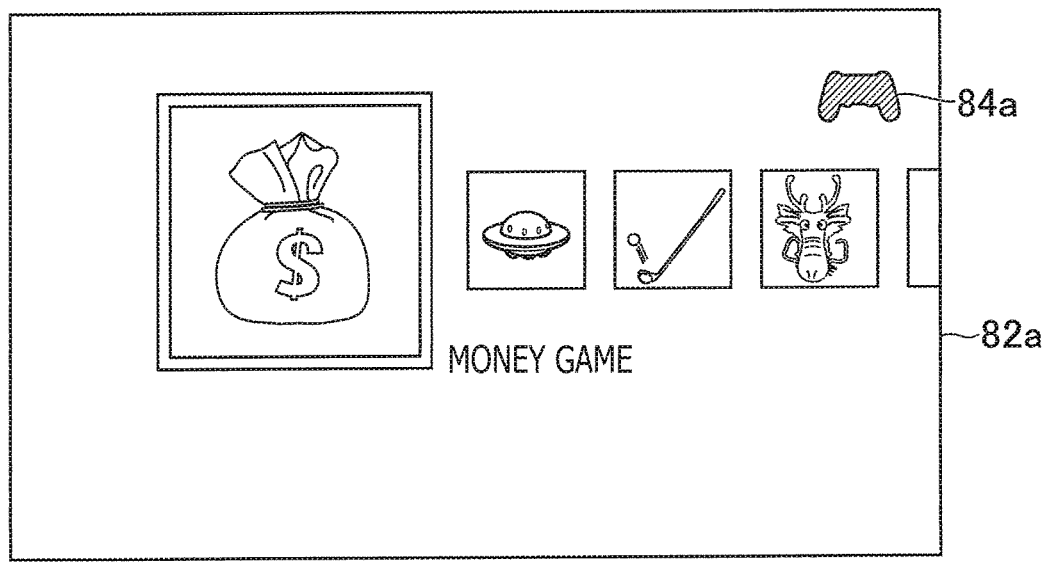
FIG. 25 is a view depicting an example of a menu screen image.
Figure 26:
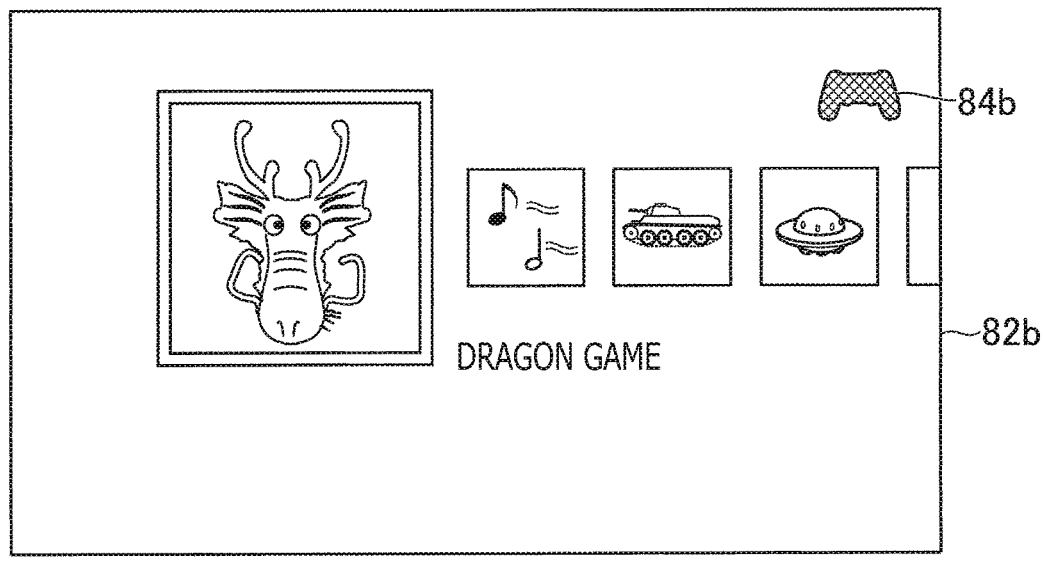
FIG. 26 is a view depicting an example of a menu screen image.

FIG. 25 is a view depicting an example of a menu screen image 82a of the user who operates the controller 18a. FIG. 26 is a view depicting an example of a menu screen image 82b of the user who operates the controller 18b. The menu screen image 82a is an example of a screen image in which information regarding the user who operates the controller 18a and information representing light emission of the controller 18a are arranged. The menu screen image 82b is an example of a screen image in which information regarding the user who operates the controller 18b and information that represents light emission of the controller 18b are arranged.

In the present embodiment, it is assumed that, for example, after the controller 18a is connected to the entertainment apparatus 12, the user who operates the controller 18a performs an operation for designating the user ID of the user. In response to this, the menu screen image 82a in which information of a program that can be executed by the user and so forth are arranged is displayed on the display 14. It is assumed that, after the controller 18b is connected to the entertainment apparatus 12 after then, the user who operates the controller 18b performs an operation for designating the user ID of the user. Consequently, the menu screen image 82b in which information of a program that can be executed by the user and so forth are arranged is displayed on the display 14.

Further, in the present embodiment, a light emission representation image 84a that represents light emission of the controller 18a is arranged in the menu screen image 82a. Further, a light emission representation image 84b in which light emission of the controller 18b is represented is arranged in the menu screen image 82b.

Here, for example, the light emission representation image 84a may be an image of blue that is a light emission color of at least part of the light emission region 48 of the controller 18a. Further, the light emission representation image 84b may be an image of red that is a light emission color of at least part of the light emission region 48 of the controller 18b.

Figure 27:
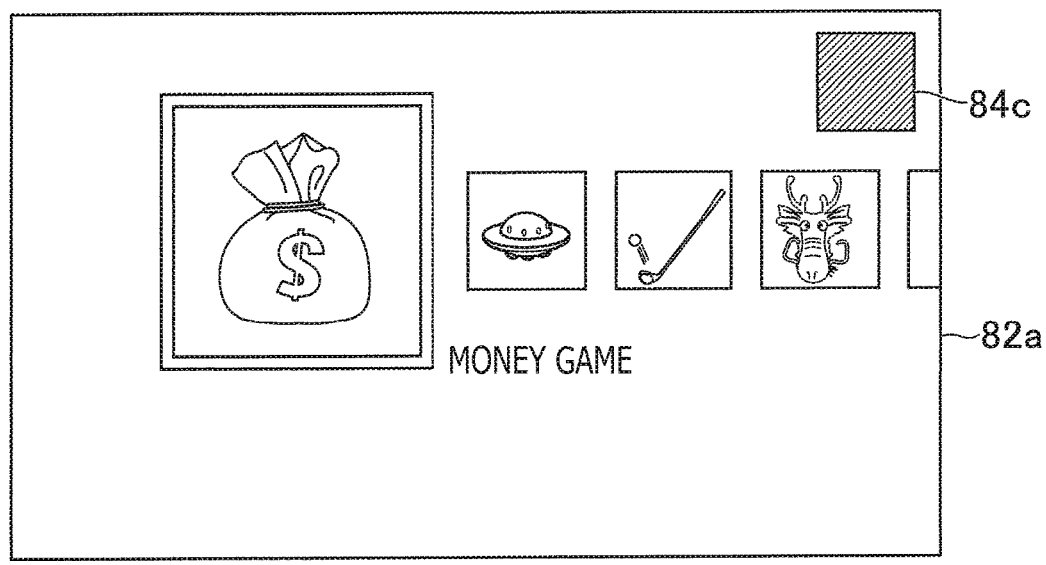
FIG. 27 is a view depicting an example of a menu screen image.

FIG. 27 is a view depicting another example of the menu screen image 82a of the user who operates the controller 18a. For example, when the entire light emission region 48 of the controller 18a emits light in blue, a light emission representation image 84c whose entire region is blue may be arranged in the menu screen image 82a as depicted in FIG. 27.

Figure 28:
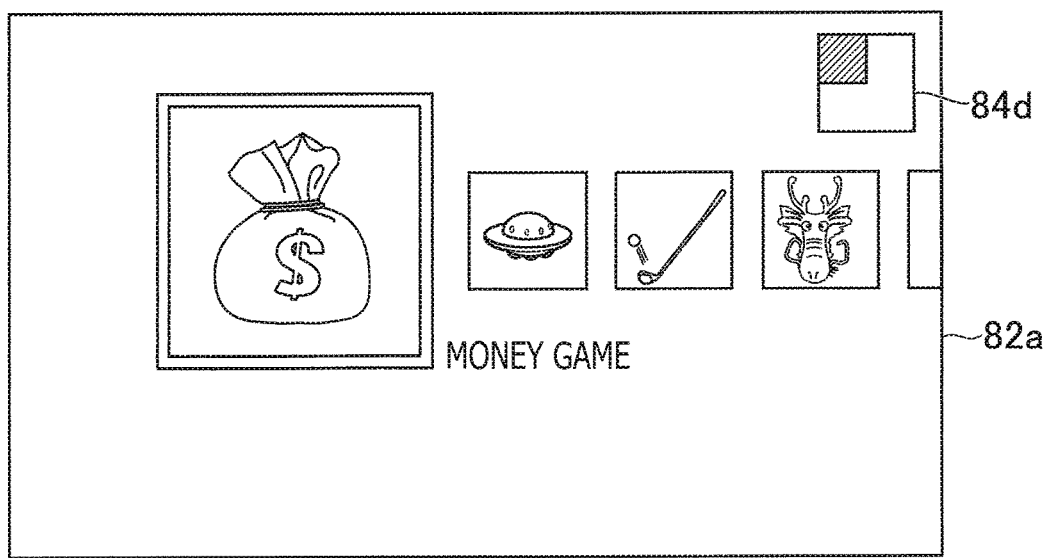
FIG. 28 is a view depicting an example of a menu screen image.

FIG. 28 is a view depicting a further example of the menu screen image 82a of the user who operates the controller 18a. For example, when the left upper region of the light emission region 48 of the controller 18a emits light in blue, a light emission representation image 84d in which the left upper region is blue and the other region is white may be arranged in the menu screen image 82a as depicted in FIG. 27. For example, when the partial light emission region 52a depicted in FIG. 4 emits light in blue, the light emission representation image 84d depicted in FIG. 27 may be arranged in the menu screen image 82a.

Figure 29:
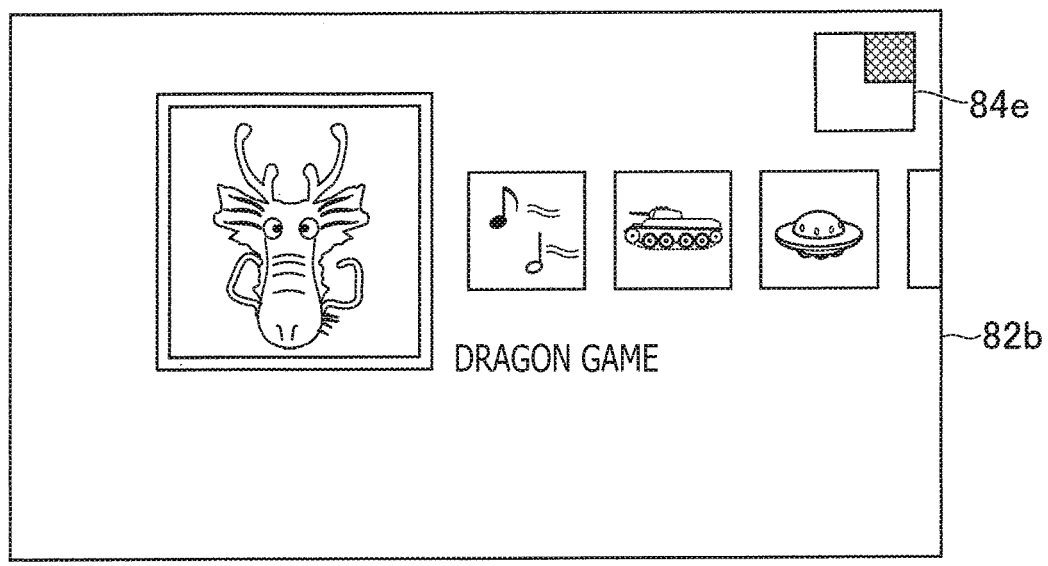
FIG. 29 is a view depicting an example of a menu screen image.

FIG. 29 is a view depicting another example of the menu screen image 82b of the user who operates the controller 18b. For example, when the right upper region of the light emission region 48 of the controller 18b emits light in red, a light emission representation image 84e in which the right upper region is red and the other region is white may be arranged in the menu screen image 82b as depicted in FIG. 29. For example, when the partial light emission region 52b depicted in FIG. 4 emits light in red, the light emission representation image 84e depicted in FIG. 29 may be arranged in the menu screen image 82b.

This makes it possible for the user to easily understand, by looking at light emission of the controllers 18 and the display 14, whether or not information relating to the user itself is displayed or information of which user is displayed on the display 14.

The input data outputting unit 70 outputs, in the present embodiment, for example, input data described hereinabove to the entertainment apparatus 12.

The control signal reception unit 72 receives, in the present embodiment, for example, the light emission controlling signal described hereinabove.

The light emission controlling unit 74 controls such that at least part of the light emission region 48 emits light in response to the light emission controlling signal received by the control signal reception unit 72.

In the following, allocation of a device ID in the present embodiment is further described.

FIG. 30 is a view depicting an example of user management data stored in the storage unit 22 of the entertainment apparatus 12 according to the present embodiment.

As depicted in FIG. 30, the user management data includes a device ID, light emission color data, light emission pattern data, a controller ID, and a user ID. In the following, the device ID, light emission color data, light emission pattern data, and user ID included in the user management data are referred to as user identification information.

The device ID is identification information associated with a controller 18 as described hereinabove and is, in the example of FIG. 30, a number.

The light emission color data is data indicative of a light emission color for the light emission unit 40. It is to be noted that the device ID may be data indicative of the light emission color. In this case, the user management data may not include the light emission color data.

The light emission pattern data is data indicative of a light emission pattern such as a region, a length, an area and so forth for the light emission. Here, as depicted in FIG. 30, the light emission pattern data may be data indicative of which partial light emission region 52 is to emit light.

The controller ID is identification information unique to a controller 18 such as a Bluetooth ID.

The user ID is identification information, for example, of the user who operates the controller 18.

FIG. 30 indicates that a value of a controller ID and a value of a user ID are set in the user management data in which the value of the device ID is 1. Further, it is indicated that a value of a controller ID is set in the user management data in which the value of the device ID is 2.

Here, it is assumed that a value of a controller ID and a value of a user ID are not set in any user management data. Then, it is assumed that, if the connection button 50 of a controller 18 is depressed in this state, then a connection request is transmitted to the entertainment apparatus 12. Here, it is assumed that the connection button 50 of the controller 18a is depressed. The connection request includes the value of the control ID. Here, if the entertainment apparatus 12 is in a state in which it is not activated, the entertainment apparatus 12 is activated.

Then, the entertainment apparatus 12 specifies user management data in which none of a value of the controller ID and a value of the user ID are set. Here, it is assumed that, for example, user management data in which the value of the device ID is 1 is specified.

Then, the value of the controller ID of the controller 18*a* is set as the value of the controller ID of the user management data. Then, the light emission representation specification unit 62 specifies a value of light emission color data included in the user management data in which the controller ID is set and a value of the light emission pattern data. Then, the light emission controlling unit 64 transmits a light emission controlling signal associated with the value of the light emission color data and the value of the light emission pattern data to the controller 18. Then, the controller 18*a* executes the light emission control described above.

Thereafter, the user ID of the user who operates the controller 18*a* is transmitted from the controller 18*a* to the entertainment apparatus 12. Consequently, the entertainment apparatus 12 sets the value of the user ID transmitted thereto from the controller 18*a* as the value of the user ID of the user management data in which the device ID is 1. In this manner, the value of the controller ID of the user management data in which the value of the device ID is 1 and the value of the user ID are set as depicted in FIG. 30.

Then, it is assumed that a connection request described hereinabove and the user ID of the user who operates the controller 18*b* are transmitted from the controller 18*b* to the entertainment apparatus 12. Consequently, the value of the controller ID of the user management data in which the value of the device ID is 2 and the value of the user ID are set similarly.

Then, it is assumed that a connection request described hereinabove and the user ID of the user who operates the controller 18*c* are transmitted from the controller 18*c* to the entertainment apparatus 12. Consequently, the value of the controller ID of the user management data in which the value of the device ID is 3 and the value of the user ID are set similarly.

It is assumed that a logout request is transmitted from the controller 18*b* after then. The logout request includes the value of the controller ID of the controller 18*b*. Consequently, the entertainment apparatus 12 erases the value of the controller ID of the user management data in which the value of the device ID is 2 and the value of the user ID. Then, the light emission controlling unit 64 transmits a light emission controlling signal indicating that no light is to be emitted to the controller 18*b*. Consequently, the controller 18*b* turns off the light emission unit 40.

It is assumed that the connection button 50 of the controller 18*d* is thereafter depressed and the user ID of the user who operates the controller 18*d* is transmitted from the controller 18*d* to the entertainment apparatus 12. In this case, the value of the controller ID of the controller 18*d* and the value of the user ID of the user who operates the controller 18*d* are set to the user management data in which the value of the device ID is 2 and from which the value of the controller ID and the value of the user ID have been erased.

It is assumed that a user switching request is transmitted from the controller 18*a* after then. The user switching request includes the value of the controller ID of the controller 18*a*. Consequently, the value of the controller ID of the user management data in which the value of the device ID is 1 is erased. In this case, the value of the user ID of the user management data in which the value of the device ID is 1 is not erased.

It is assumed that a connection request is transmitted from the controller 18*a* after then. Here, the value of the user ID is included in the user management data in which the value of the device ID is 1 as described hereinabove. Therefore, in this case, the value of the controller ID of the controller 18*a* is not set to the user management data in which the value of the device ID is 1 but is set once to the user management data in which the value of the device ID is 4. Then, light emission control is executed which is based on the emission light color data and the light pattern data included in the user management data in which the value of the device ID is 4.

It is assumed that the value of the user ID of the user who operates the controller 18*a* is transmitted after then. In this case, the entertainment apparatus 12 confirms whether or not user management data that includes the transmitted value of the user ID exists.

In the case where it is confirmed that the user management data including the transmitted value of the user ID exists, the value of the controller ID is set to the user management data. In particular, in the case where the transmitted user ID is Mike depicted in FIG. 30, the value of the controller ID of the controller 18*a* is set to the user management data in which the value of the device ID is 1. Further, the value of the controller ID set once is erased. Here, the value of the controller ID of the user management data in which the value of the device ID is 4 is erased. Then, light emission control is executed which is based on the light emission color data and the light emission pattern data included in the user management data in which the value of the device ID is 1.

On the other hand, in the case where it is confirmed that user management data that includes the transmitted value of the user ID does not exist, the transmitted value of the user ID is set to the user management data to which the value of the controller ID has been set once in such a manner as described above. Here, for example, the value of the user ID is set to the user management data in which the value of the device ID is 4.

An application program to be executed by the entertainment apparatus 12 according to the present embodiment may execute various processes without referring to the value of the controller ID.

Further, data equivalent to the device ID, light emission color data, and light emission pattern data included in the user management data described above may be stored in the storage unit 32 of the controller 18.

Then, in response to transmission of a connection request to the entertainment apparatus 12 by the controller 18, the entertainment apparatus 12 may transmit the device ID set to the controller 18 to the controller 18. Further, the controller 18 may execute such light emission control as described above on the basis of the light emission color data and the light emission pattern data associated with the device ID.

It is to be noted that the present invention is not limited to the embodiment described above.

For example, the functions of the touch sensor 42 and the light emission unit 40 included in the controller 18 may be incorporated in the touch panel. In this case, the region other than the specific light emission region 80 in the light emission region 48 may be controlled so as to emit light in a color different from the color according to the device ID of the controller 18. For example, the region in the light emission region 48 other than the specific light emission regions 80 may be controlled so as to emit light in white.

Further, the position, shape, or size of the partial light emission region 52 is not limited to any of those described hereinabove. For example, the light emission region 48 depicted in FIG. 10 may be arranged in front of the touch sensor 42, namely, above the touch sensor 42 in FIG. 10.

Further, for example, the first light emission region 48*a* depicted in FIG. 14 may be arranged in front of the touch sensor 42, namely, above the touch sensor 42 in FIG. 14, and the second light emission region 48*b* may be arranged behind the touch sensor 42, namely, below the touch sensor 42 in FIG. 14.

Further, for example, the button provided on the right side or the direction key provided on the left side of the upper face of the controller 18 may be configured so as to emit light. In this case, the light emission region 48 is a region in which the button is arranged or a region in which the direction key is arranged.

Further, the light emission region 48 need not be set to the upper face of the controller 18. For example, the light emission region 48 may be set partly or entirely to the front face of the controller 18.

Further, particular character strings and numerical values described hereinabove and particular character strings and numerical values in the drawings are exemplary, and such character strings and numerical values are not restrictive.

The invention claimed is:

1. A controller for receiving input from a user, comprising:
   a plurality of input elements, each operating to receive respective operative input from the user, the respective operative input being processed and transmitted to an external apparatus for manipulating an application program during execution;
   a memory having a plurality of sets of user-selectable profile data stored therein, each set of user-selectable profile data includes a respective profile ID in association with respective location information indicative of where a respective one of the input elements is located on the controller;
   a communication unit operating to receive a user-selected one of the plurality of sets of user-selectable profile data; and
   a control unit operating to control the controller based on the selected profile data set received from the communication unit such that one or more of the plurality of input elements are re-configured in response to the user-selected one of the plurality of sets of user-selectable profile data.

2. The controller of claim 1, wherein each set of profile data includes a respective function for a respective one of the input elements.

3. The controller of claim 2, wherein each of the plurality of input elements operate, via the control unit, in accordance with the respective function as one or more of directional keys, buttons, operation sticks, touch pads, and keypads.

4. The controller of claim 3, wherein the respective function for each set of profile data operates, via the control unit, to set the respective input element to operate as one of the directional keys, buttons, operation sticks, touch pads, and keypads.

5. The controller of claim 4, wherein one of the functions is null such that the respective input element does not operate to receive user input.

6. The controller of claim 4, wherein the controller is operable such that the user is permitted to change a respective function of a given one of the plurality of input elements by changing the user-selected one of the plurality of sets of profile data to be associated with the respective location information indicative of where the given one of the plurality of input elements is located on the controller.

* * * * *